United States Patent
Kobayashi et al.

(10) Patent No.: US 11,479,622 B2
(45) Date of Patent: Oct. 25, 2022

(54) ACTIVE ENERGY RAY CURABLE COMPOSITION, ACTIVE ENERGY RAY CURABLE INK, COMPOSITION ACCOMMODATING CONTAINER, TWO OR THREE DIMENSIONAL IMAGE FORMING APPARATUS, TWO OR THREE DIMENSIONAL IMAGE FORMING METHOD, CURED MATTER, DECORATIVE MATTER, ARTIFICIAL NAIL COMPOSITION, NAIL DECORATIVE MATERIAL, AND ARTIFICIAL NAIL

(71) Applicant: RICOH COMPANY, LTD., Tokyo (JP)

(72) Inventors: Masahide Kobayashi, Kanagawa (JP); Mitsunobu Morita, Shizuoka (JP); Takashi Okada, Kanagawa (JP); Takenori Suenaga, Kanagawa (JP); Soh Noguchi, Kanagawa (JP); Tatsuki Yamaguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 324 days.

(21) Appl. No.: 16/822,099

(22) Filed: Mar. 18, 2020

(65) Prior Publication Data
US 2020/0299425 A1 Sep. 24, 2020

(30) Foreign Application Priority Data

Mar. 19, 2019 (JP) .............................. JP2019-051569

(51) Int. Cl.
*C09D 11/30* (2014.01)
*C09D 11/101* (2014.01)
(Continued)

(52) U.S. Cl.
CPC .............. *C08F 22/38* (2013.01); *A45D 31/00* (2013.01); *C08F 2/48* (2013.01); *C08F 20/28* (2013.01);
(Continued)

(58) Field of Classification Search
CPC ........ A45D 31/00; B33Y 10/00; B33Y 70/00; B33Y 80/00; C09D 11/30; C09D 11/101;
(Continued)

(56) References Cited

U.S. PATENT DOCUMENTS 9,796,862 B2 * 10/2017 Morita ................ B41J 2/17513
2012/0242768 A1 * 9/2012 Seno ..................... B41M 7/0081
347/102

(Continued)

FOREIGN PATENT DOCUMENTS

JP 2009-126833 6/2009
JP 2011-020956 2/2011
(Continued)

*Primary Examiner* — Anh T Vo
(74) *Attorney, Agent, or Firm* — Grüneberg and Myers PLLC

(57) ABSTRACT

An active energy ray curable composition contains an acrylamide compound A1 represented by the following Chemical formula 1 or the following Chemical formula 2;
a multi-functional polymerizable compound B1 having an SI value of 3 or less in a skin sensitivity test;
a polymerization initiator C1 having no maximum absorption peak in a wavelength range of from 365 to 405 nm; and
a hydrogen donor D, Chemical Formula 1

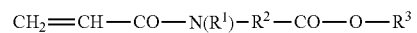

Chemical Formula 2

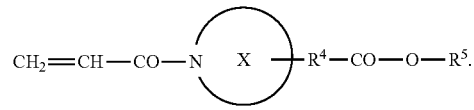

16 Claims, 2 Drawing Sheets

(51) Int. Cl.
   *C08F 2/48* (2006.01)
   *C08F 20/28* (2006.01)
   *C08F 22/38* (2006.01)
   *A45D 31/00* (2006.01)
   *B33Y 80/00* (2015.01)
   *B33Y 10/00* (2015.01)
   *B33Y 70/00* (2020.01)

(52) U.S. Cl.
   CPC ............ *C09D 11/101* (2013.01); *C09D 11/30* (2013.01); *B33Y 10/00* (2014.12); *B33Y 70/00* (2014.12); *B33Y 80/00* (2014.12)

(58) Field of Classification Search
   CPC .. C08F 2/48; C08F 20/28; C08F 22/38; C08F 220/58; C08F 222/106; C08F 222/1006; C08F 222/1025; C08F 222/1061

See application file for complete search history.

(56) References Cited

U.S. PATENT DOCUMENTS

| | | | |
|---|---|---|---|
| 2013/0144057 A1* | 6/2013 | Morita | C07C 271/14 |
| | | | 546/245 |
| 2014/0363634 A1* | 12/2014 | Morita | C08F 120/58 |
| | | | 564/204 |
| 2020/0010662 A1 | 1/2020 | Hiraoka et al. | |
| 2020/0032068 A1 | 1/2020 | Yamaguchi et al. | |
| 2020/0032089 A1 | 1/2020 | Kobayashi et al. | |
| 2020/0038309 A1 | 2/2020 | Suenaga et al. | |
| 2020/0038310 A1 | 2/2020 | Suenaga et al. | |

FOREIGN PATENT DOCUMENTS

| | | |
|---|---|---|
| JP | 2015-013980 | 1/2015 |
| JP | 2015-189668 | 11/2015 |
| JP | 2015-209390 | 11/2015 |
| JP | 2016-141634 | 8/2016 |
| JP | 2017-141177 | 8/2017 |
| JP | 2018-027944 | 2/2018 |
| JP | 2018-533563 | 11/2018 |
| WO | WO2017/086373 A1 | 5/2017 |

* cited by examiner

ACTIVE ENERGY RAY CURABLE COMPOSITION, ACTIVE ENERGY RAY CURABLE INK, COMPOSITION ACCOMMODATING CONTAINER, TWO OR THREE DIMENSIONAL IMAGE FORMING APPARATUS, TWO OR THREE DIMENSIONAL IMAGE FORMING METHOD, CURED MATTER, DECORATIVE MATTER, ARTIFICIAL NAIL COMPOSITION, NAIL DECORATIVE MATERIAL, AND ARTIFICIAL NAIL

CROSS-REFERENCE TO RELATED APPLICATIONS

This patent application is based on and claims priority pursuant to 35 U.S.C. § 119 to Japanese Patent Application No. 2019-051569, filed on Mar. 19, 2019, in the Japan Patent Office, the entire disclosures of which are hereby incorporated by reference herein.

BACKGROUND

Technical Field

The present invention relates to an active energy ray curable composition, an active energy ray curable ink, a composition accommodating container, a two or three dimensional image forming apparatus, a two or three dimensional image forming method, cured matter, decorative matter, an artificial nail composition, a nail decorative material, and an artificial nail.

Description of the Related Art

Gel nail is known to decorate nails. Gel nail is a nail material having fluidity and photopolymerizable upon irradiation of ultraviolet rays and visible light.

SUMMARY

According to embodiments of the present disclosure, provided is an active energy ray curable composition which contains an acrylamide compound A1 represented by the following Chemical formula 1 or the following Chemical formula 2, a multi-functional polymerizable compound B1 having an SI value of 3 or less in a skin sensitivity test, a polymerization initiator C1 having no maximum absorption peak in a wavelength range of from 365 to 405 nm, and a hydrogen donor D,

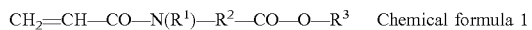

Chemical formula 1 where $R^1$ represents a hydrogen atom or an alkyl group having a linear or branched chain having one to four carbon atoms, $R^2$ represents an alkyl group having a linear or branched chain having one to four carbon atoms, $R^3$ represents an alkyl group having a linear or branched chain having one to four carbon atoms, and a total number of carbon atoms of $R^1$, $R^2$, and $R^3$ is from two to six, Chemical formula 2

where X represents a ring structure having a nitrogen atom and two to five carbon atoms, $R^4$ represents a single bond or an alkyl group having a linear or branched chain having one to three carbon atoms, $R^5$ represents a linear or branched chain having one to three carbon atoms, and a total number of carbon atoms of X, $R^4$, and $R^5$ are from three to six.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
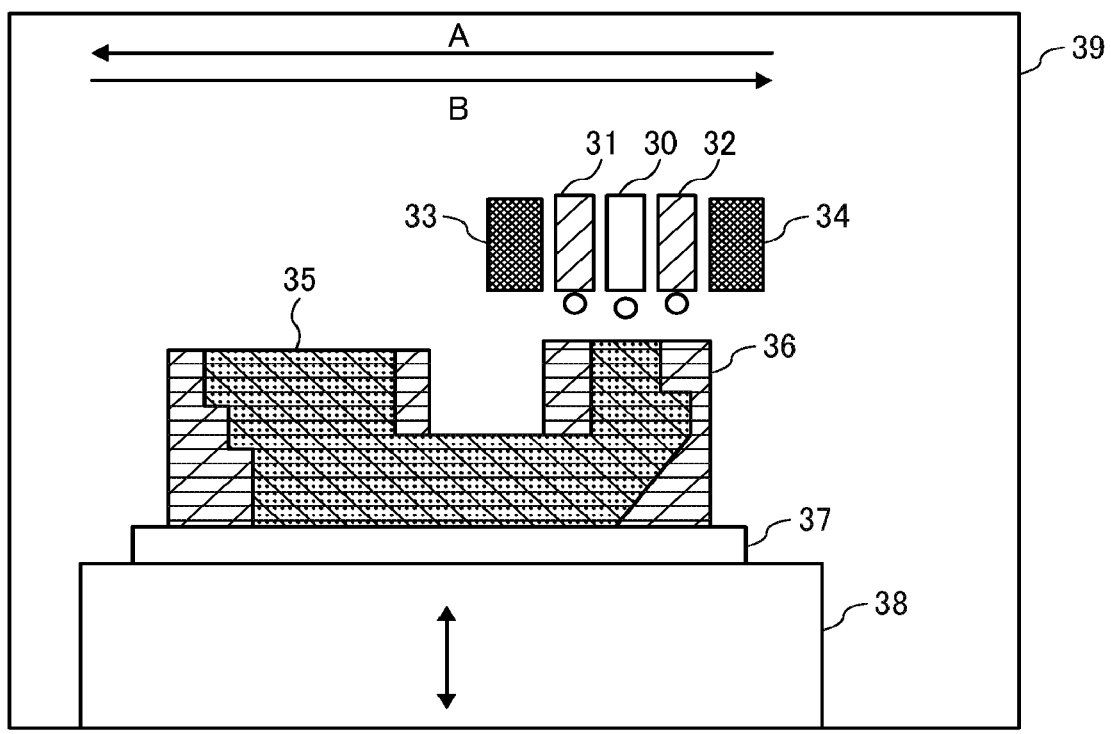
FIG. 1 is a schematic diagram illustrating an example of an image forming device to fabricate a three dimensional object.
Figure 2A:
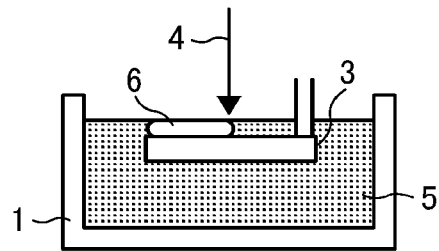
FIGS. 2A to 2D are schematic diagrams illustrating an example of a method for solid freeform fabrication using a composition.
Figure 2B:
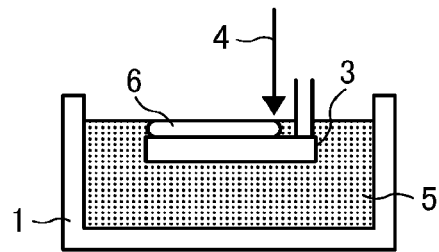
Figure 2C:
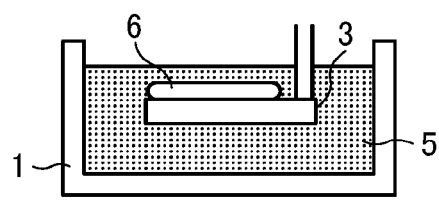
Figure 2D:
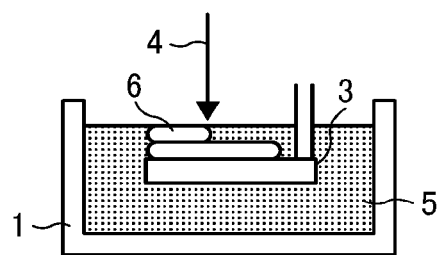

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, a composition can be provided which is highly curable and water-resistant with less yellow discoloration and safe about skin sensitization. Being safe about skin sensitization means an SI value (indicating the degree of sensitivity) of 3 or less in the skin sensitivity test according to the local lymph node assay (LLNA) method.

The LLNA method is a skin sensitivity test defined as an OECD test guideline. When a substance having a stimulation index (SI) value indicating the degree of skin sensitivity of 3 or less, it is determined as having no problem with skin sensitivity as shown in a document such as "Function and Materials" (published in September, 2005, Vol. 25, No. 9, P 55).

As gel nail, an artificial nail composition has been proposed in JP-2015-209390-A1, JP-5240939-B1 (JP-2011-20956-A1), JP-2015-189668-A1, and JP-2016-141634-A1 which contains a urethane resin, a monomer, and a polymerization initiator.

As the nail composition having a photopolymerization reaction property, a radical polymerizable composition of active energy ray curable type are widely used in terms of the production cost and storage stability of the composition.

As such a radical polymerizable composition of active energy ray curable type, a composition is known which contains a polymerizable monomer such as an acrylic acid ester and a polymerization initiator producing radicals upon irradiation of active energy rays.

In terms of environmental protection, a light source of a nail composition having photopolymerization reaction property has been changing from a mercury lamp and a metal halide lamp to a light-emitting diode (LED). In addition, a nail composition having photopolymerization reaction property with less yellow discoloration and sufficiently curable upon a small amount of irradiation energy of LED such as an integrated light quantity of 2.0 J/cm$^2$ or less has been demanded in terms of production efficiency.

Composition

The composition of the present disclosure contains the acrylamide compound A1 represented by the following Chemical formula 1 or the following Chemical formula 2, a multi-functional polymerizable compound B1 having an SI value of 3 or less in the skin sensitivity test, a polymerization initiator C1 having no maximum absorption peak in the wavelength range of from 365 to 405 nm, and a hydrogen donor D, and other optional components.

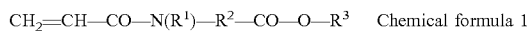
$CH_2=CH-CO-N(R^1)-R^2-CO-O-R^3$    Chemical formula 1

In Chemical formula 1, $R^1$ represents a hydrogen atom or an alkyl group having a linear or branched chain having one to four carbon atoms, $R^2$ represents an alkyl group having a linear or branched chain having one to four carbon atoms, $R^3$ represents an alkyl group having a linear or branched chain having one to four carbon atoms. The total number of carbon atoms of $R^1$, $R^2$, and $R^3$ is from two to six.

Chemical formula 2

In Chemical formula 2, X represents a ring structure having a nitrogen atom and two to five carbon atoms, $R^4$ represents a single bond or an alkyl group having a linear or branched chain having one to three carbon atoms, $R^5$ represents a linear or branched chain having one to three carbon atoms. The total number of carbon atoms of X, $R^4$, and $R^5$ are from three to six.

The composition of the present disclosure was made based on the knowledge that, since a polymerization initiator that adsorbs light having a wavelength of from 365 to 405 nm in order to support a UV-LED light source in typical technology, it causes yellow discoloration and moreover, other problems such as odor, skin irritation, and skin sensitization ascribable to monomers and polymerization initiators, in particular, (meth)acrylate ester compounds, which are easily available and inexpensive, and most of them are highly toxic and cause allergy when they touch skin, but no solution is provided.

The composition of the present disclosure contains the acrylamide compound A1 represented by the Chemical formula 1 or the Chemical formula 2 illustrated above, a multi-functional polymerizable compound B1 having an SI value of 3 or less in the skin sensitivity test, a polymerization initiator C1 having no maximum absorption peak in the wavelength range of from 365 to 405 nm, and a hydrogen donor. Therefore, cured matter having high curability and water-resistance can be obtained, which is also safe about skin sensitization with less yellow discoloration.

As the composition of the present disclosure, a curable composition is preferable. Examples of the curable composition include, but are not limited to, a thermocurable composition and an active energy ray-curable composition, which is more preferable.

In the specification of the present disclosure, (meth)acrylic acid ester means an acrylic acid acrylate or a methacrylic acid ester. (Meth)acrylate means acrylate or methacrylate.

Acrylamide Compound A1

The acrylamide compound A1 has an acrylamide group and an ester structure, and is a polymerizable monomer in an active energy ray-curable composition.

Acrylamide group shows polymerizability and is formed by bonding an acryloyl group ($CH_2=CH-CO-$) with a nitrogen atom of an amine compound.

The method of synthesizing the acrylamide compound A1 is not particularly limited and includes reacting a compound having an activated acryloyl group such as acrylic acid chloride or acrylic acid anhydride with an amine compound. The amine compound used for synthesizing the acrylamide compound A1 may be any of a primary amine and a secondary amine. Of the two, the secondary amine is preferable in terms that a tertiary amide, which is advantageous for lowering the viscosity and does not generate a hydrogen bond between amide groups, is obtained.

The ester structure of the acrylamide compound A1 is preferably a linear or branched alkyl ester group having one to four carbon atoms.

Specific examples of the linear or branched alkyl ester group having one to four carbon atoms include, but are not limited to, a methyl group, an ethyl group, a propyl group, an isopropyl group, a butyl group, a sec-butyl group, an isobutyl group and a tert-butyl group.

The acrylamide compound A1 is preferably a compound represented by the following Chemical formula 1.

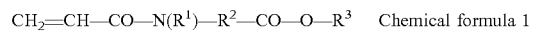
$CH_2=CH-CO-N(R^1)-R^2-CO-O-R^3$    Chemical formula 1

In Chemical formula 1, $R^1$ represents a hydrogen atom or an alkyl group having a linear or branched chain having one to four carbon atoms, $R^2$ represents an alkyl group having a linear or branched chain having one to four carbon atoms, $R^3$ represents an alkyl group having a linear or branched chain having one to four carbon atoms, and the total number of carbon atoms of $R^1$, $R^2$, and $R^3$ is from two to six, In Chemical formula 1, $R^1$ is preferably a linear or branched alkyl group having one to four carbon atoms.

Specific examples of $R^1$ include, but are not limited to, a methyl group, an ethyl group, a propyl group, an isopropyl group, a butyl group, a sec-butyl group, an isobutyl group and a tert-butyl group.

In Chemical formula 1, specific examples of $R^2$ include, but are not limited to, a methylene group, ethane-1,1-diyl group, ethane-1,2-diyl group, propane-1,1-diyl group, propane-1,2-diyl group, propane-1,3-diyl group, butane-1,1-diyl group, butane-1,2-diyl group, butane-1,3-diyl group, butane-1,4-diyl group, 2-methylpropane-1,1-diyl group, 2-methylpropane-1,2-diyl group, and 2-methylpropane-1,3-diyl group.

In Chemical formula 1, $R^3$ is preferably an alkyl group having one to two carbon atoms.

Specific examples of $R^3$ include, but are not limited to, a methyl group, ethyl group, propyl group, isopropyl group, butyl group, sec-butyl group, isobutyl group, and tert-butyl group.

The total number of carbon atoms of $R^1$, $R^2$, and $R^3$ is from two to six,

The acrylamide compound A1 is preferably a compound represented by the following Chemical formula 2.

Chemical formula 2

In Chemical formula 2, X represents a ring structure having a nitrogen atom and two to five carbon atoms, $R^4$ represents a single bond or an alkyl group having a linear or branched chain having one to three carbon atoms, $R^5$ represents a linear or branched chain having one to three carbon atoms. The total number of carbon atoms of X, $R^4$, and $R^5$ are from three to six.

In Chemical formula 2, specific examples of X include, but are not limited to, aziridine, azetidine, pyrrolidine, and piperidine, and pyrrolidine and piperidine are preferable.

In Chemical formula 2, specific example of $R^4$ include, but are not limited to, a single bond, a methylene group, ethane-1,1-diyl group, ethane-1,2-diyl group, propane-1,1-diyl group, propane-1,2-diyl group, propane-1, and 3-diyl group.

In Chemical formula 2, specific example of $R^5$ include, but are not limited to, a methyl group, ethyl group, propyl group, and isopropyl group.

The total number of carbon atoms of X, $R^4$, and $R^5$ are from three to six.

Preferred specific examples of the compound represented by the Chemical formula 1 or Chemical formula 2 include, but are not limited to, N-acryloyl-N-alkyl amino acid alkyl ester (including N-acryloyl proline alkyl ester) and N-acryloyl piperidine carboxylic acid alkyl ester. The alkyl group in this paragraph means a linear or branched alkyl group having one to four carbon atoms, particularly preferably an alkyl group having 1 or 2 carbon atoms (i.e., a methyl group or ethyl group).

Specific examples of N-acryloyl-N-alkyl amino acid alkyl ester include, but are not limited to, N-acryloyl-N-methylglycine methyl ester, N-acryloyl-N-methylglycine ethyl ester, N-acryloyl-N-methylglycinepropyl esters, N-acryloyl-N-methylglycine butyl ester, N-acryloyl-N-ethylglycine methyl ester, N-acryloyl-N-ethylglycine ethyl ester, N-acryloyl-N-ethylglycine propyl ester, N-acryloyl-N-propylglycine methyl ester, N-acryloyl-N-propylglycine ethyl ester, N-acryloyl-N-butylglycine methyl ester, N-acryloyl-N-methylalanine methyl ester, N-acryloyl-N-methylalanine ethyl ester, N-acryloyl-N-methylalanine propyl ester, N-acryloyl-N-ethylalanine methyl ester, N-acryloyl-N-ethylalanine ethyl ester, N-acryloyl-N-propylalanine methyl ester, N-acryloyl-N-methyl-O-alanine methyl ester, N-acryloyl-N-methyl-β-alanine ethyl ester, N-acryloyl-N-ethyl-β-alanine methyl ester, N-acryloyl-N-ethyl-β-alanine ethyl ester, N-acryloyl-N-methylvaline methyl ester, N-acryloylproline methyl ester, and N-acryloylproline ethyl ester.

Specific examples of the N-acryloyl piperidine carboxylate include, but are not limited, methyl N-acryloyl piperidine-2-carboxylate, methyl N-acryloylpiperidine-3-carboxylate, and methyl N-acryloyl piperidine-4-carboxylate.

A specific example of the compound represented by Chemical formula 1 or 2 other than the alkyl ester of N-acryloyl-N-alkylamino acid and N-acryloyl piperidine carboxylic acid include, but are not limited to, methacryloyl oxyethylacrylamide.

Further, when the acrylamide compound A1 is represented by Chemical formula 1 or 2, it is preferable because skin sensitivity ascribable to the polymerizable monomer contained in the composition of the present disclosure can be reduced.

The molecular weight of the acrylamide compound A1 is preferably from 150 to 250 and more preferably from 150 to 200. When the molecular weight is 150 or more, odor due to volatilization of the compound can be reduced and the stability of inkjet discharging can be improved, which is preferable. The molecular weight is preferably 250 or less because curability of the composition is excellent, strength of the cured matter is improved, and moreover, viscosity of the composition is not increased.

The acrylamide compound A1 is preferably a colorless transparent or pale yellow transparent liquid having a low viscosity (100 mPa s or less) at room temperature (25 degrees C.) for application to an inkjet recording method. In addition, the acrylamide compound A1 which does not show strong acidity or basicity and does not contain harmful formaldehyde as impurities are preferable in terms of the safety of users.

Many acrylamide compounds having a polymerizable acrylamide group and not containing an ester structure are commercially available (e.g., N-acryloylmorpholine, N,N-dimethylacrylamide, N,N-diethylacrylamide, N-isopropylacrylamide, N-(2-hydroxyethyl)acrylamide, N-(hydroxymethyl)acrylamide, N-(butoxymethyl)acrylamide, N-[3-(dimethylamino)propyl] acrylamide, N-(1,1-dimethyl-3-oxobutyl) acrylamide, 2-acrylamide-2-methylpropane sulfonic acid, etc.). However, it is difficult to find an acrylamide compound satisfying all the effects of the present disclosure. According to the present disclosure, inclusion of the acrylamide compound A1 having an ester structure having a moderate polarity in neutral state is found to satisfy the effects of the present disclosure.

The proportion of the acrylamide compound A1 from 4.8 to 94.8 percent by mass, more preferably from 9.8 to 84.8 percent by mass, and furthermore preferably from 19.8 to 74.8 percent by mass of the total amount of the composition of the present disclosure. When the content of the acrylamide compound A1 is 19.8 or more percent by mass, the liquid contact property of the composition of an adhesive used for assembling an ink discharging head is preferably improved. Further, it is preferable that the proportion of the acrylamide compound A1 be 94.8 or less percent by mass to make the composition have excellent curability when the composition is irradiated with active energy rays. The acrylamide Compound A1 can be used alone or in combination.

Many acrylamide compounds having a polymerizable acrylamide group and not containing an ester structure are commercially available (for example, N-acryloylmorpholine, N,N-dimethylacrylamide, N,N-diethylacrylamide, N-isopropylacrylamide, N-(2-hydroxyethyl)acrylamide, N-(hydroxymethyl)acrylamide, N-(butoxymethyl)acrylamide, N-[3-(dimethylamino)propyl] acrylamide, N-(1,1-dimethyl-3-oxobutyl) acrylamide, 2-acrylamide-2-methylpropane sulfonic acid, etc.). However, it is difficult to find an acrylamide compound that satisfies all the effects of the present disclosure. According to the present disclosure, inclusion of the acrylamide compound represented by Chemical formula 1 or 2 having an ester structure having a moderate polarity in neutral state is found to satisfy the effects of the present disclosure.

Next, specific example of the acrylamide compound represented by Chemical formula 1 or 2 include, but are not limited to, the group a to the group i.

Examples of the group a include, but are not limited to, the following groups a1 to a6. These can be used alone or in combination.

Exemplary Compound Group a1

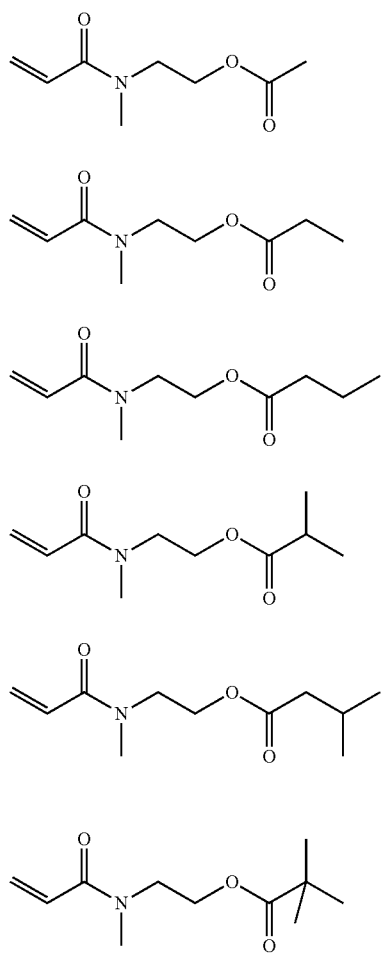

Exemplary Compound Group a2

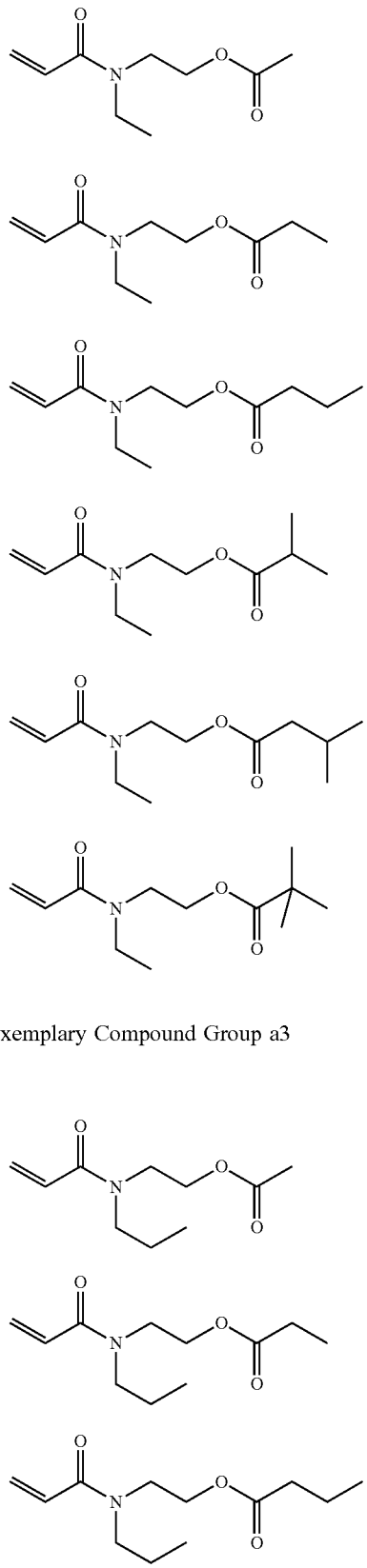

Exemplary Compound Group a3

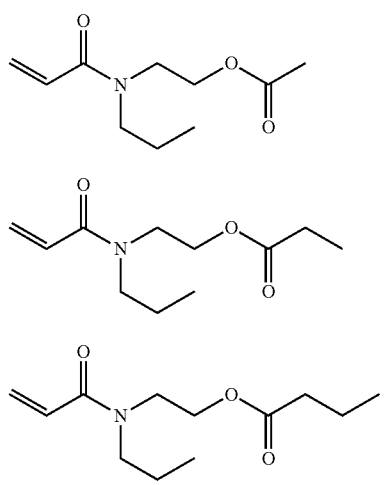

-continued
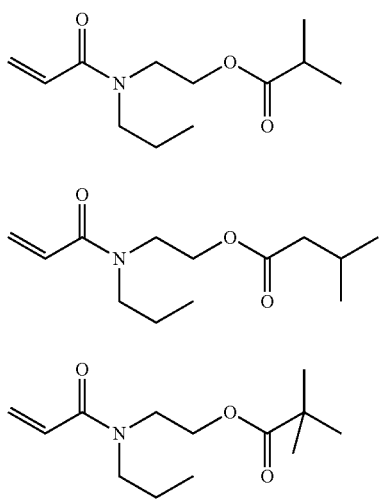
Exemplary Compound Group a4
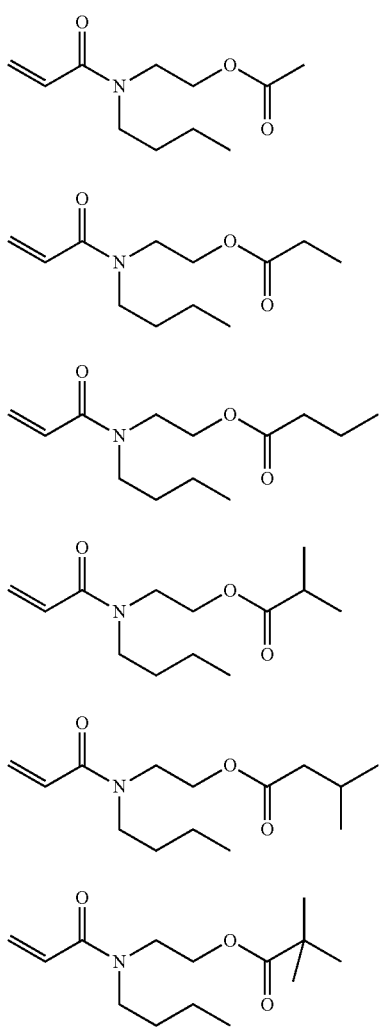
Exemplary Compound Group a5
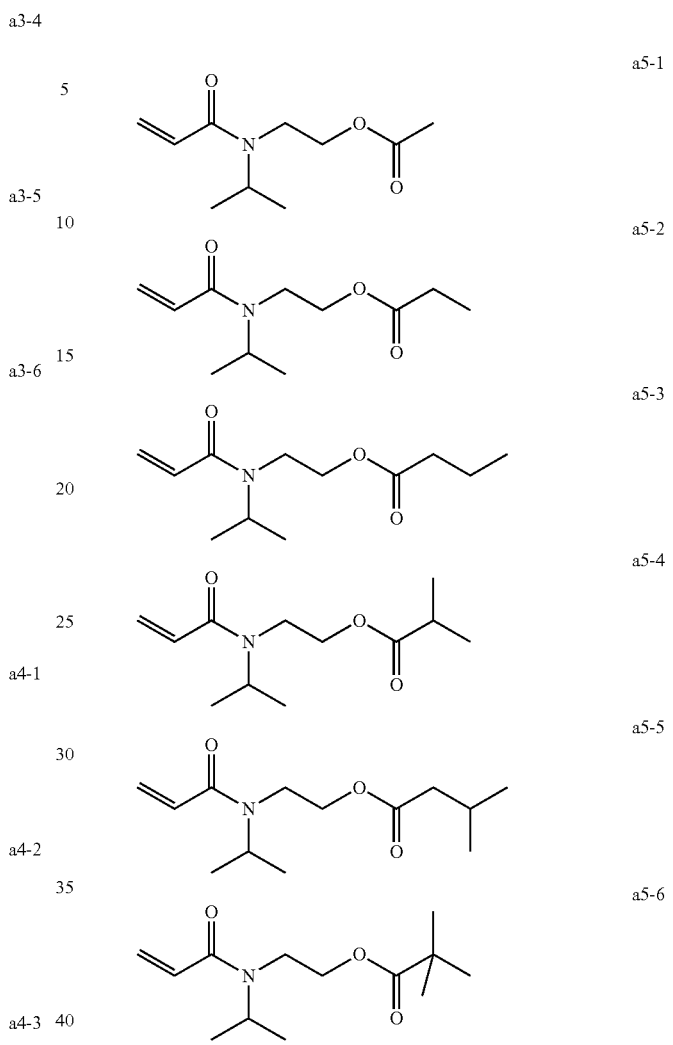
Exemplary Compound Group a6
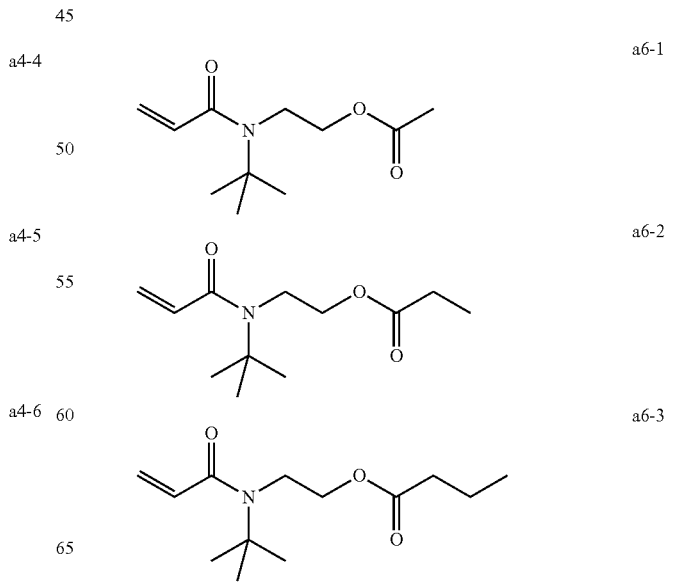

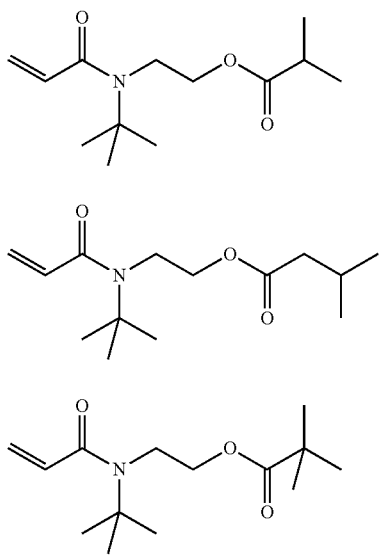
Examples of the group b include, but are not limited to, compounds of the following groups b1 to b6. These can be used alone or in combination.
Exemplary Compound Group b1
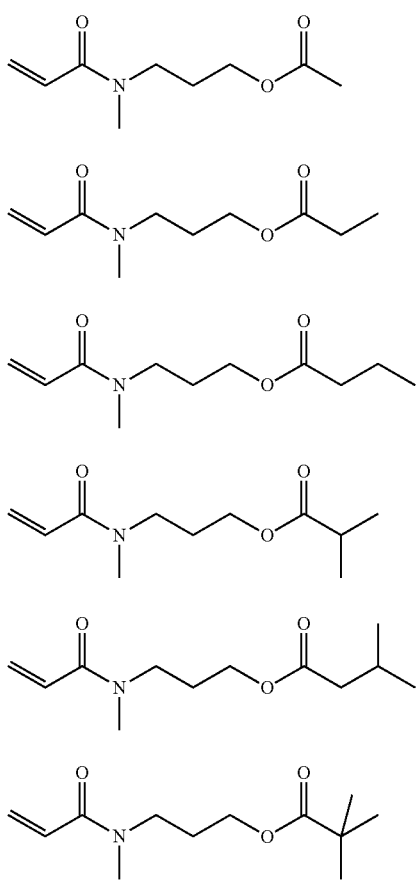
Exemplary Compound Group b2
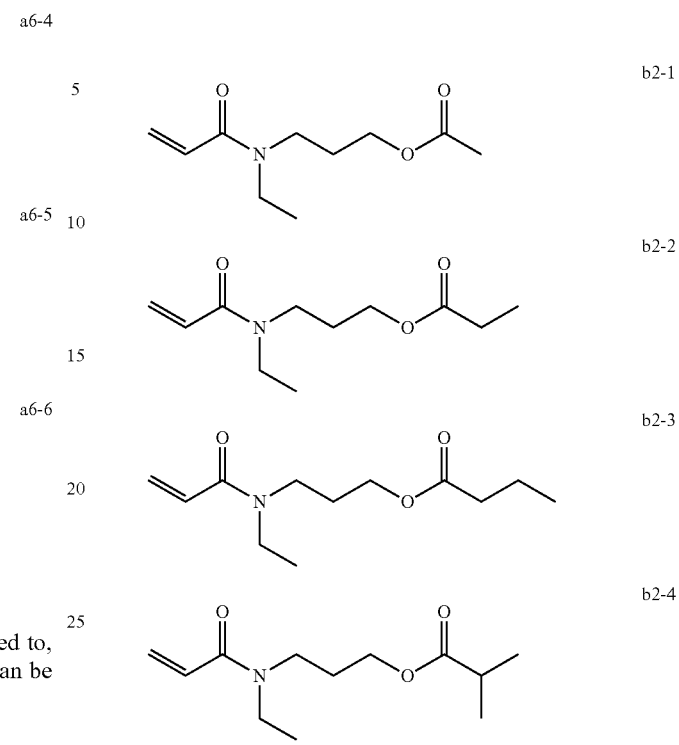
Exemplary Compound Group b3
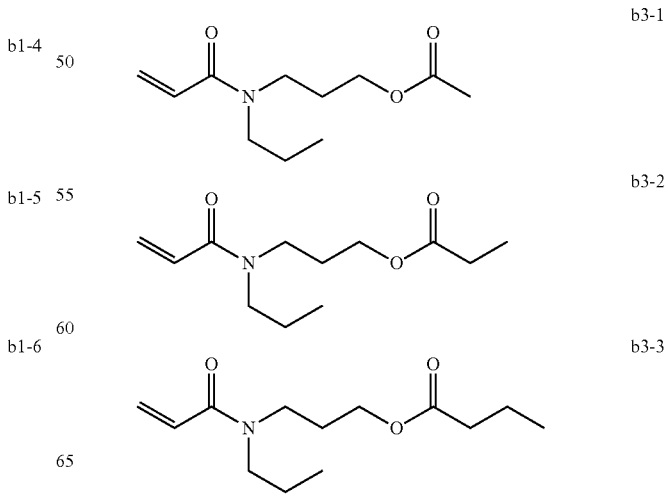

-continued
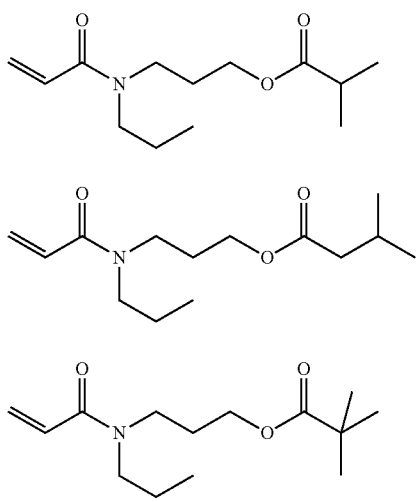
Exemplary Compound Group b4
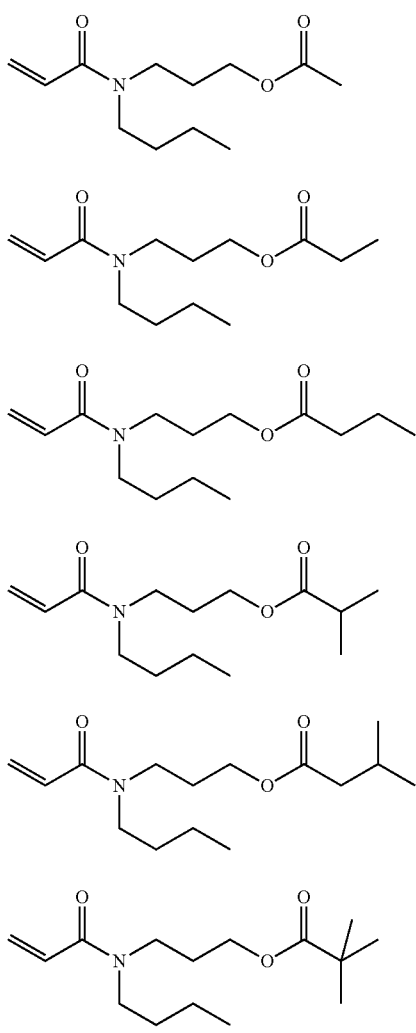
Exemplary Compound Group b5
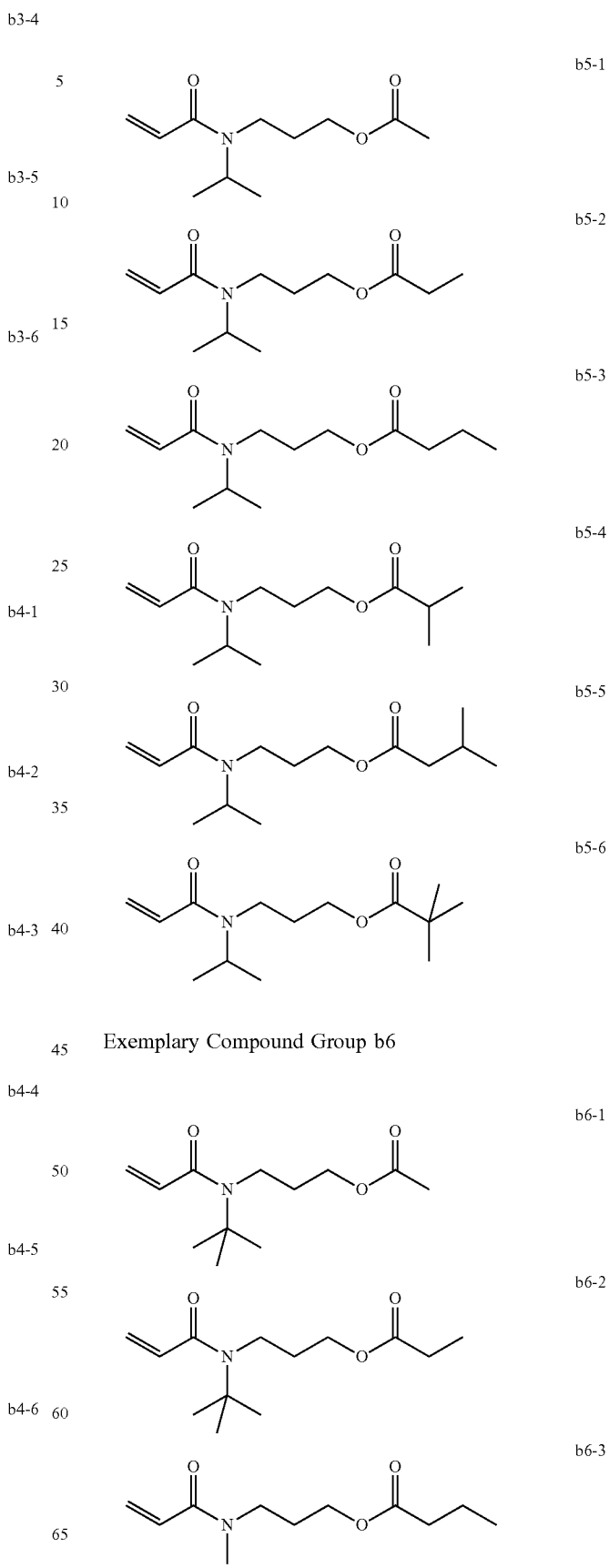
Exemplary Compound Group b6

-continued
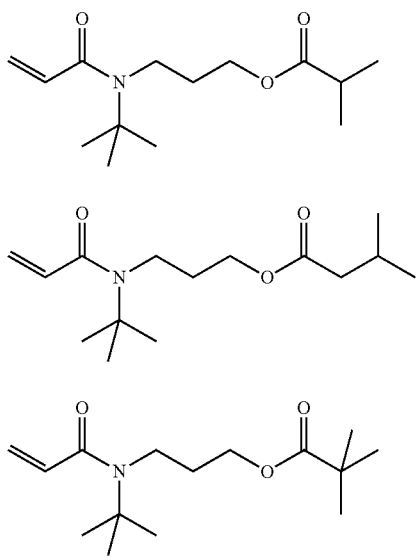
b6-4
b6-5
b6-6
Examples of the group c include, but are not limited to, compounds of the following groups c1 to c6. These can be used alone or in combination.
Exemplary Compound Group c1
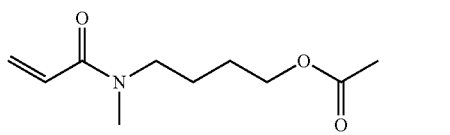
c1-1
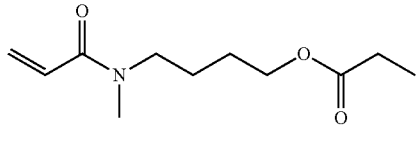
c1-2
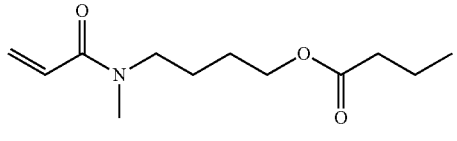
c1-3
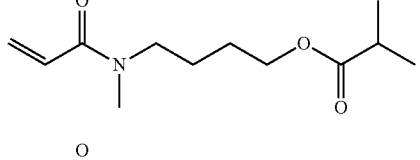
c1-4
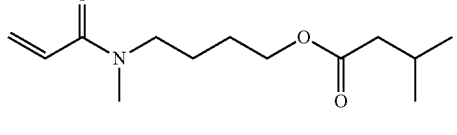
c1-5
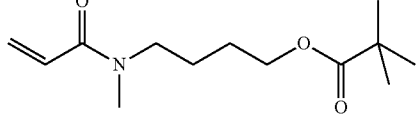
c1-6
Exemplary Compound Group c2
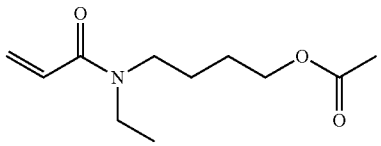
c2-1
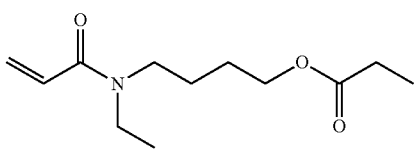
c2-2
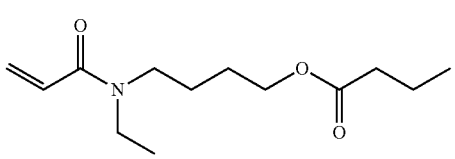
c2-3
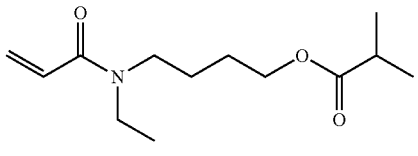
c2-4
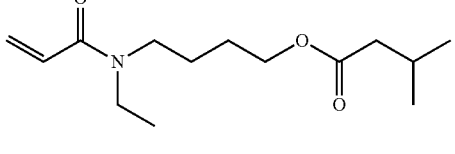
c2-5
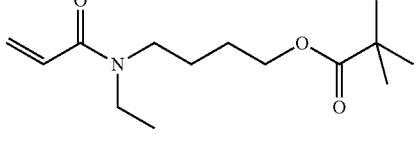
c2-6
Exemplary Compound Group c3
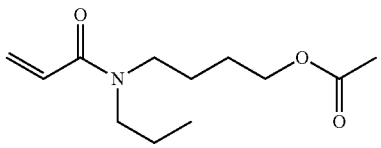
c3-1
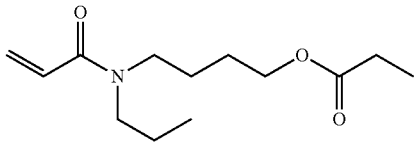
c3-2
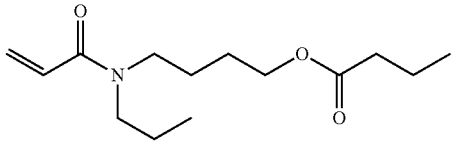
c3-3

-continued
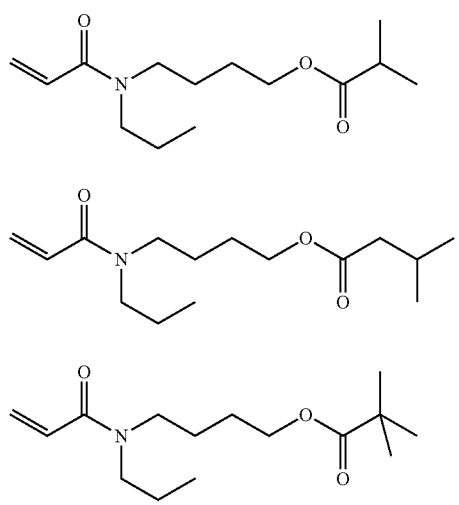
c3-4
c3-5
c3-6
Exemplary Compound Group c4
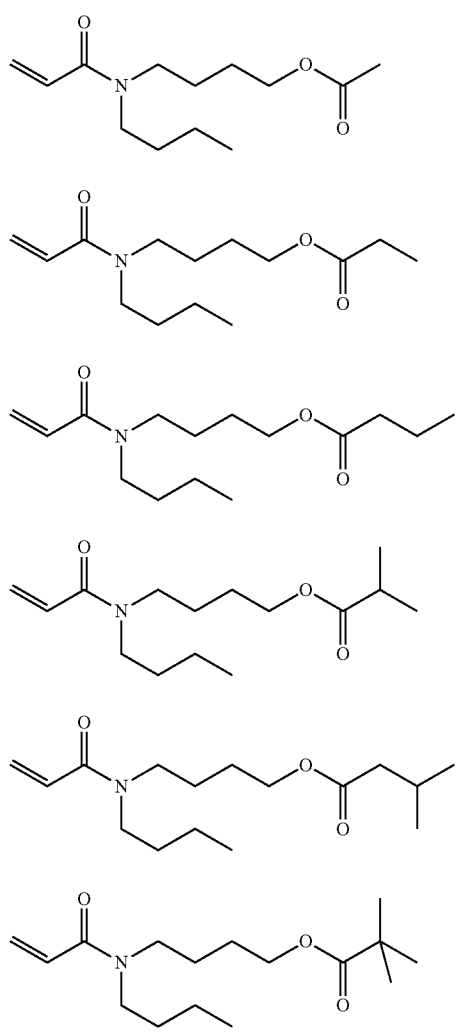
c4-1
c4-2
c4-3
c4-4
c4-5
c4-6
Exemplary Compound Group c5
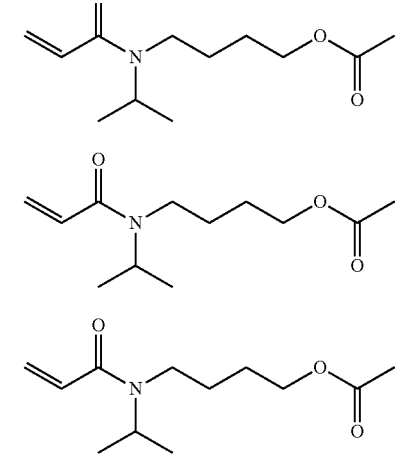
c5-1
c5-2
c5-3
c5-4
c5-5
c5-6
Exemplary Compound Group c6
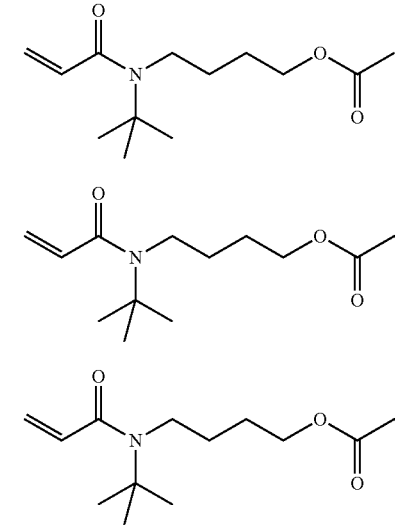
c6-1
c6-2
c6-3

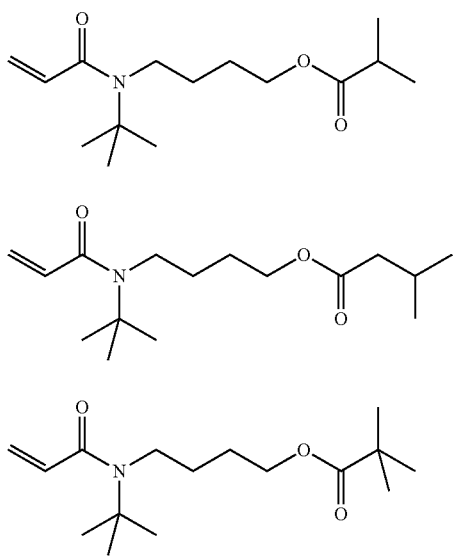
Examples of the group d include, but are not limited to, compounds of the following groups d1 to d6. These can be used alone or in combination.
Exemplary Compound Group d1
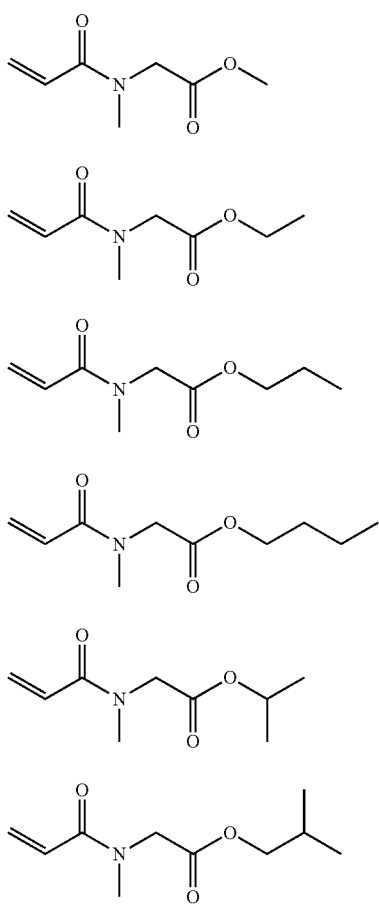
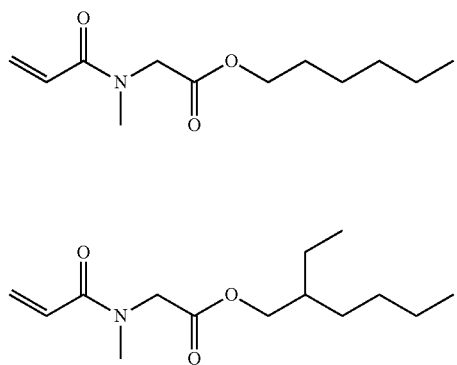
Exemplary Compound Group d2
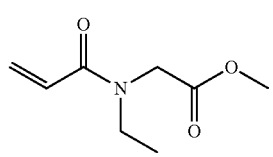
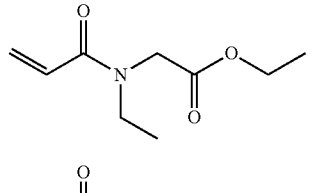
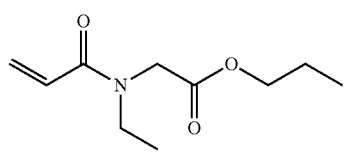
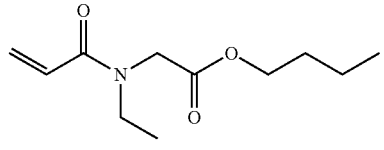
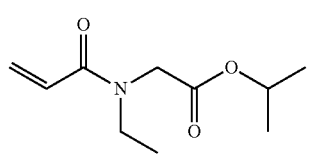
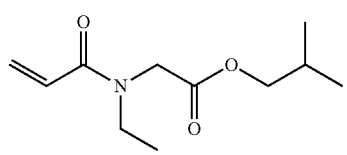
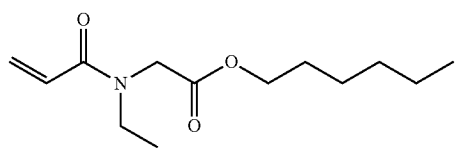

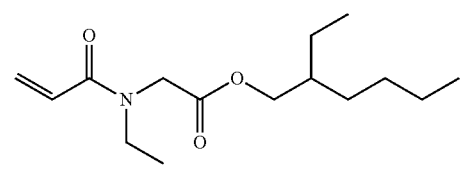
d2-8
Exemplary Compound Group d3
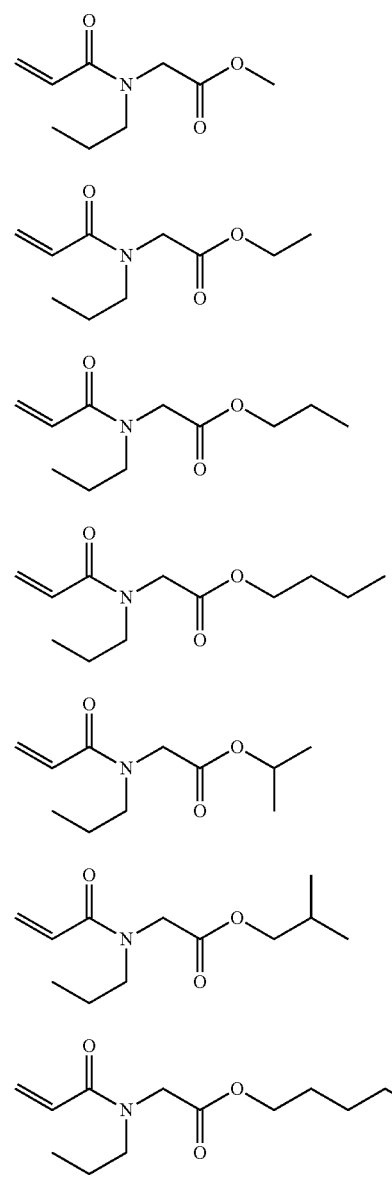
d3-1
d3-2
d3-3
d3-4
d3-5
d3-6
d3-7
d3-8
Exemplary Compound Group d4
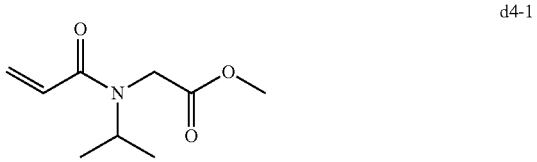
d4-1
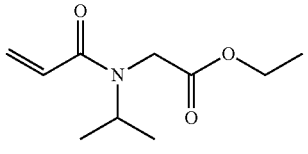
d4-2
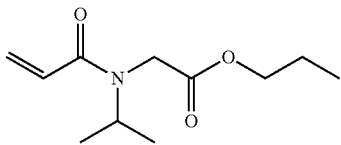
d4-3
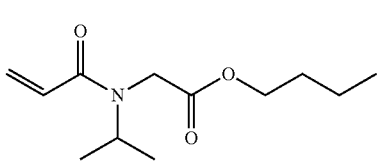
d4-4
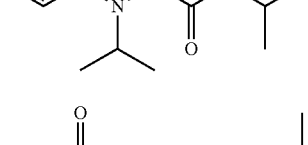
d4-5
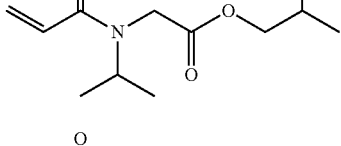
d4-6
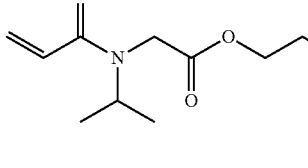
d4-7
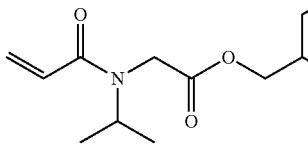
d4-8
Exemplary Compound Group d5
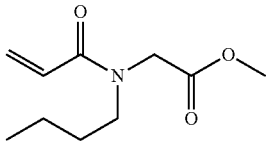
d5-1

-continued
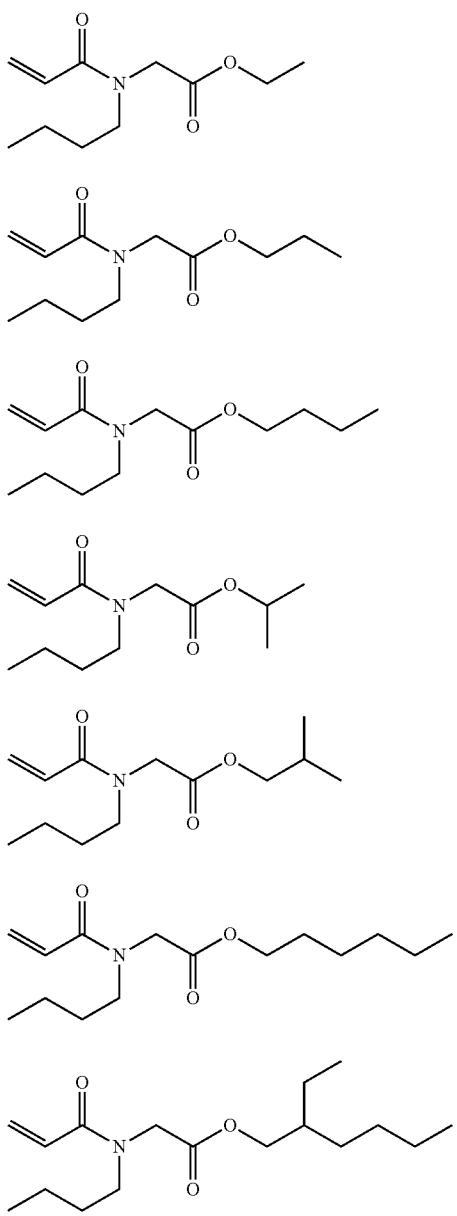
Exemplary Compound Group d6
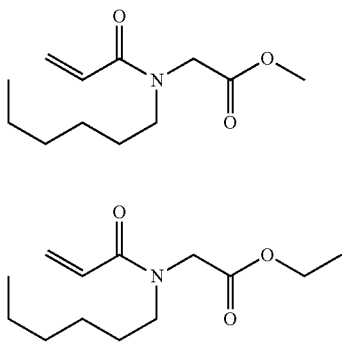
-continued
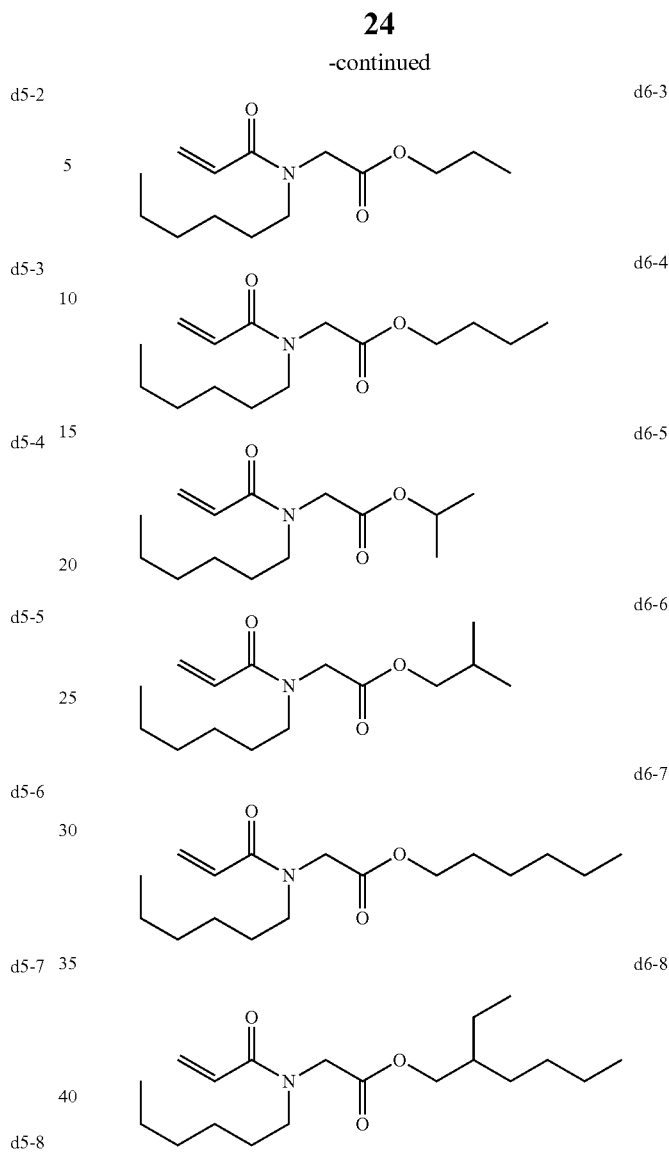
Examples of the group e include, but are not limited to, compounds of the following groups e1 to e6. These can be used alone or in combination.
Exemplary Compound Group e1
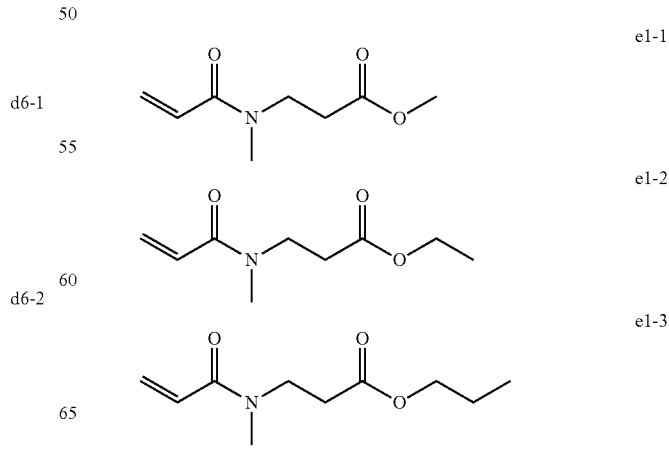

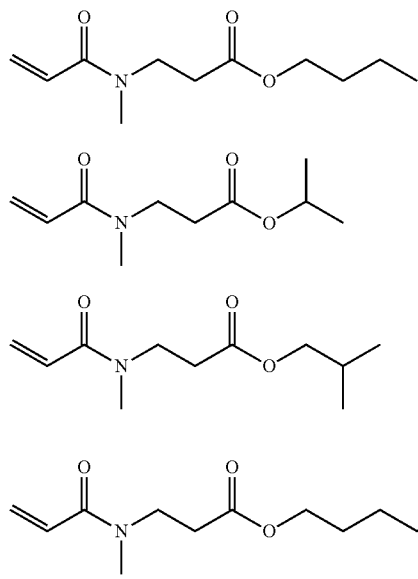
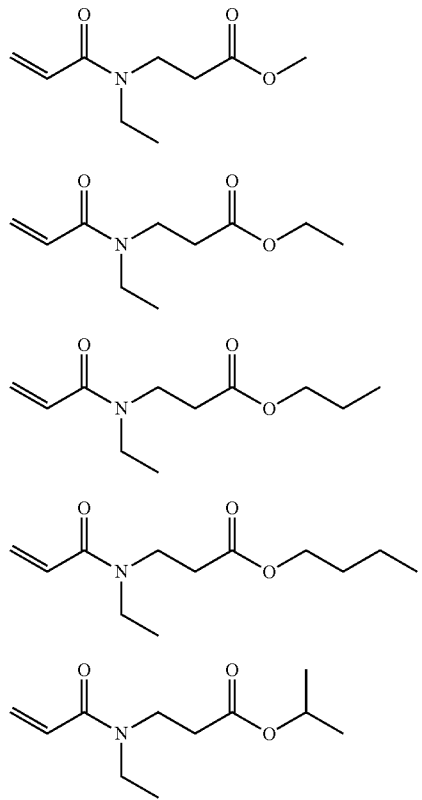
Exemplary Compound Group e2
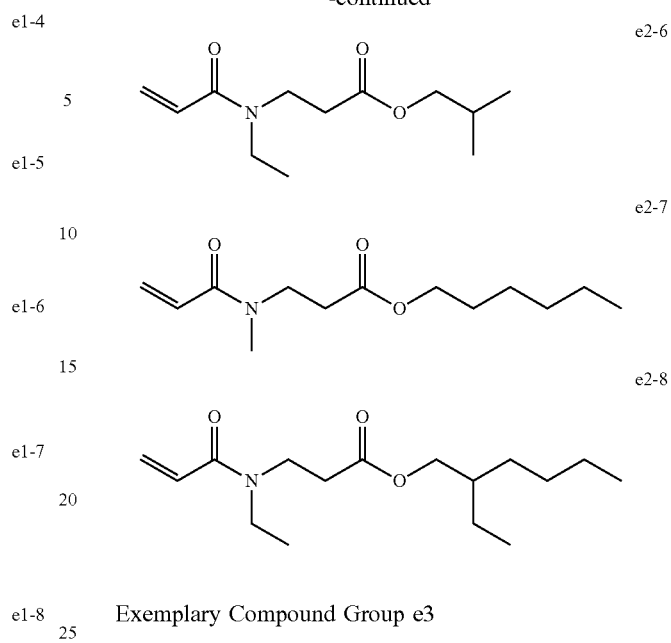
Exemplary Compound Group e3
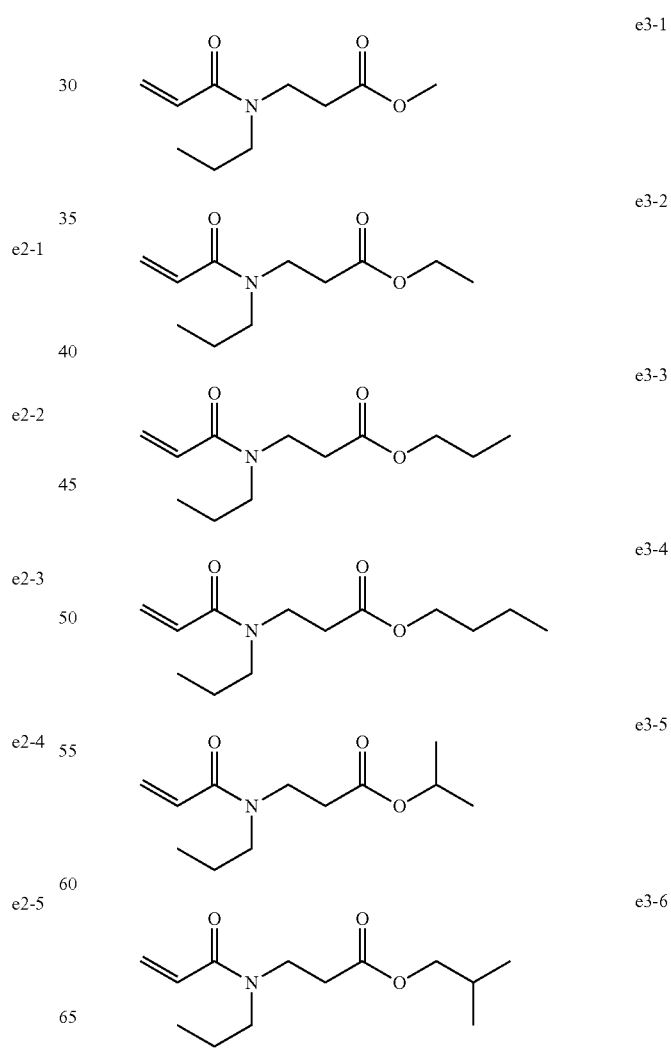

e3-7
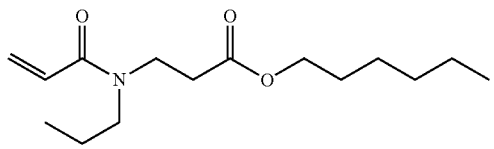
e3-8
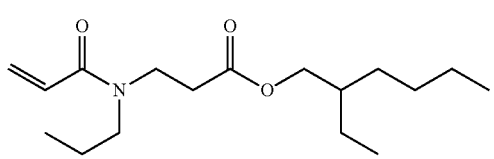
Exemplary Compound Group e4
e4-1
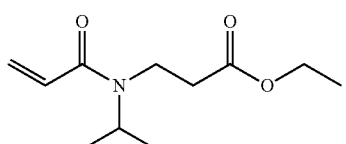
e4-2
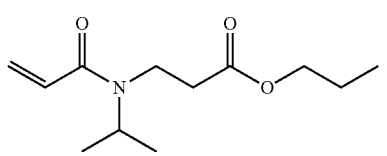
e4-3
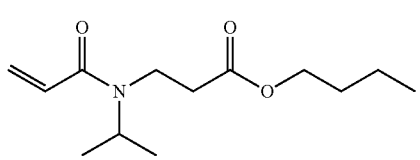
e4-4
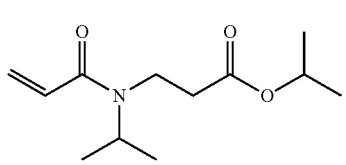
e4-5
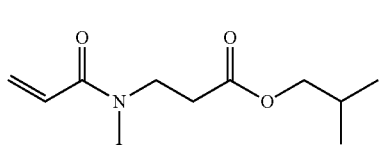
e4-6
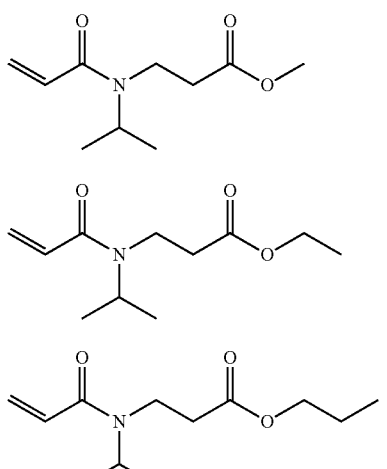
e4-7
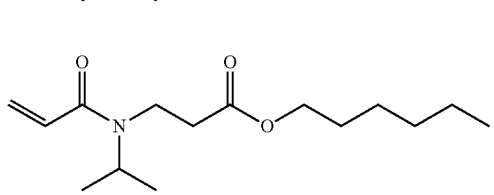
e4-8
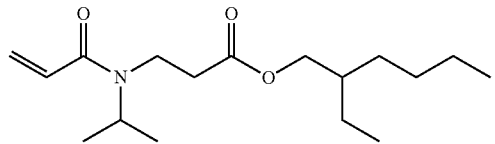
Exemplary Compound Group e5
e5-1
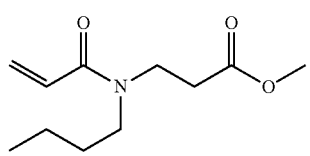
e5-2
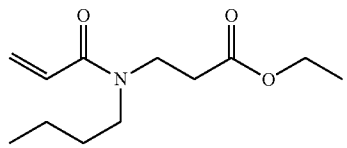
e5-3
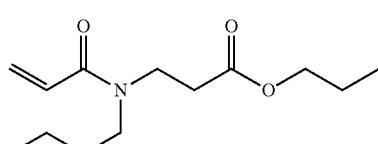
e5-4
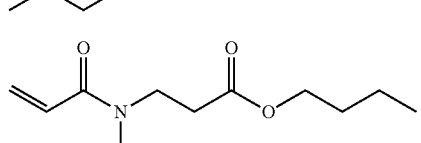
e5-5
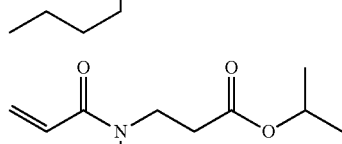
e5-6
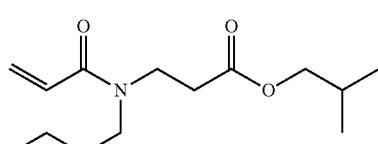
e5-7
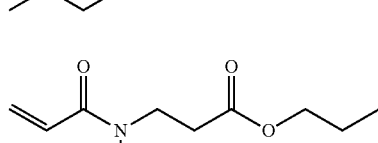
e5-8
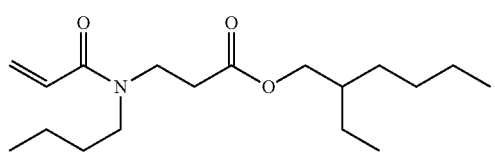

Exemplary Compound Group e6
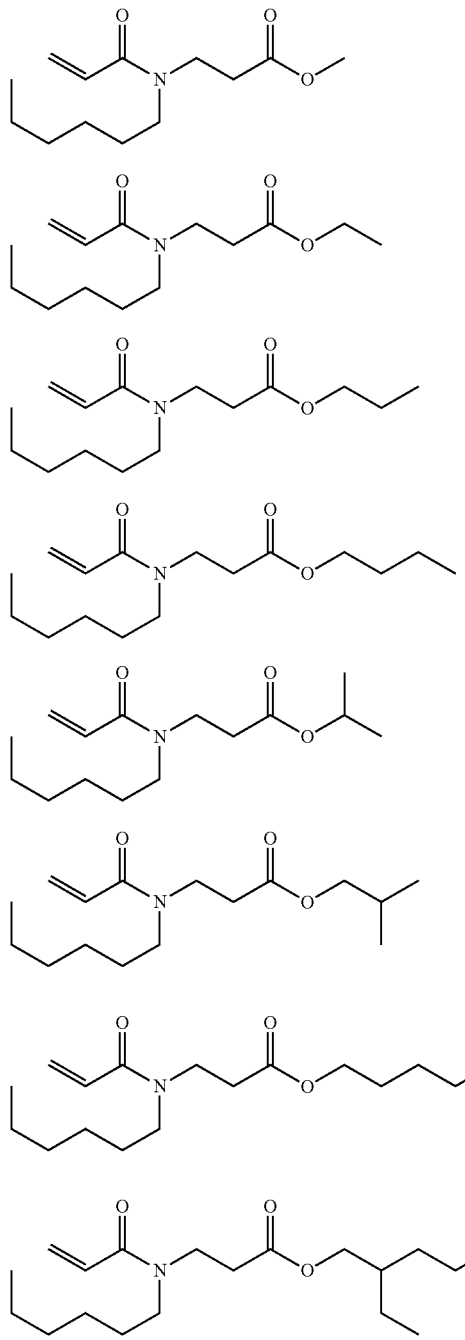
Examples of the group f include, but are not limited to, compounds of the following group f1. These can be used alone or in combination.
Exemplary Compound Group f1
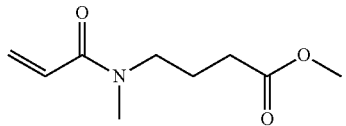
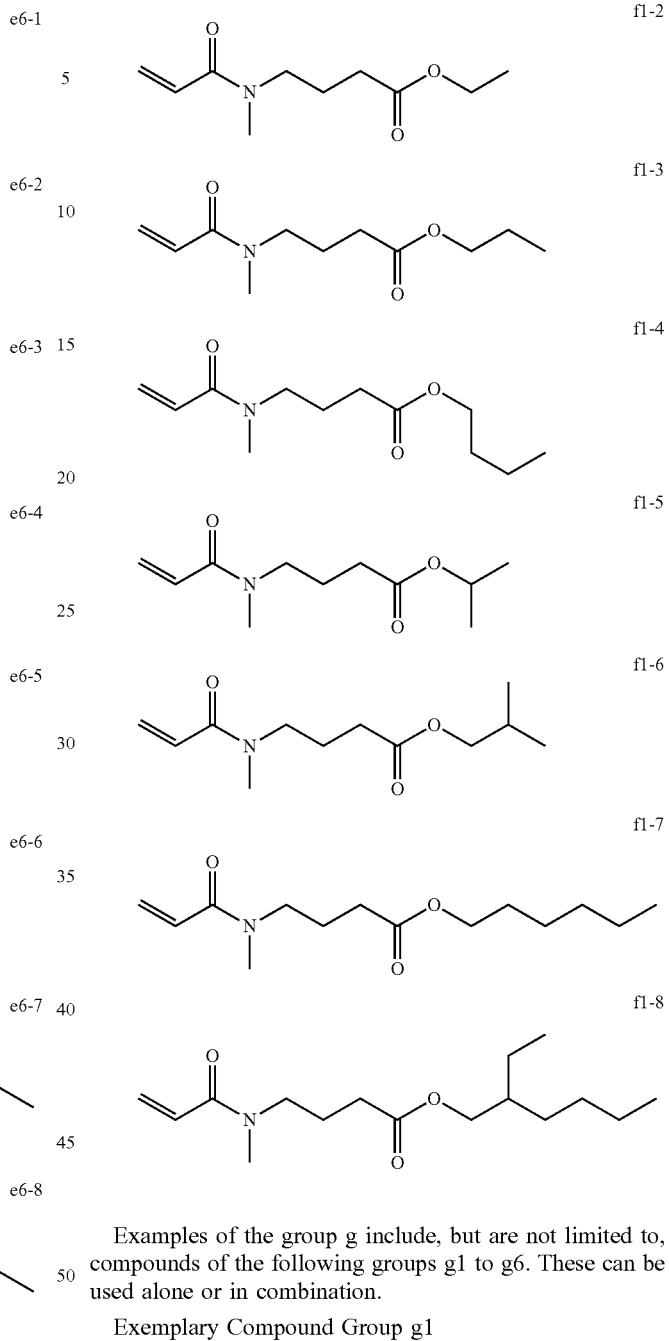
Examples of the group g include, but are not limited to, compounds of the following groups g1 to g6. These can be used alone or in combination.
Exemplary Compound Group g1
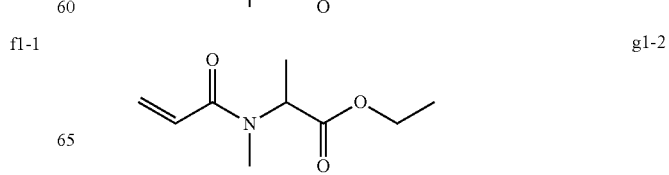

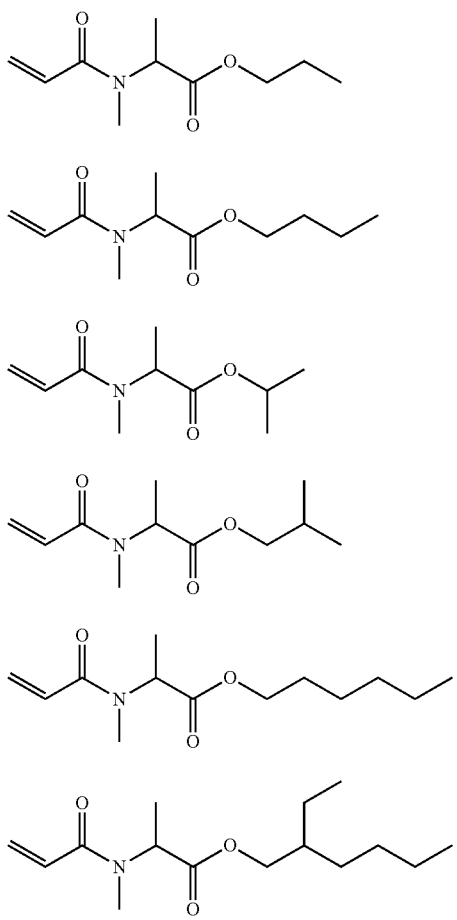
Exemplary Compound Group g2
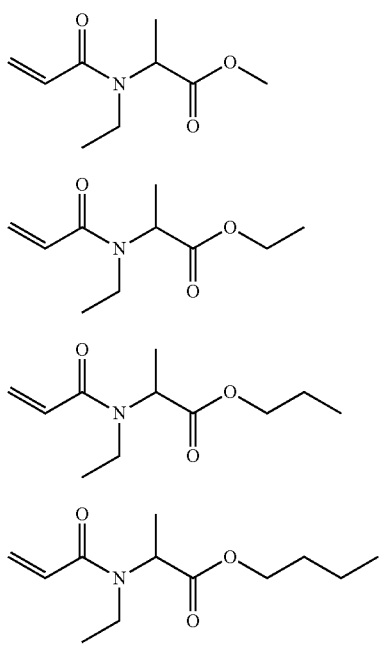
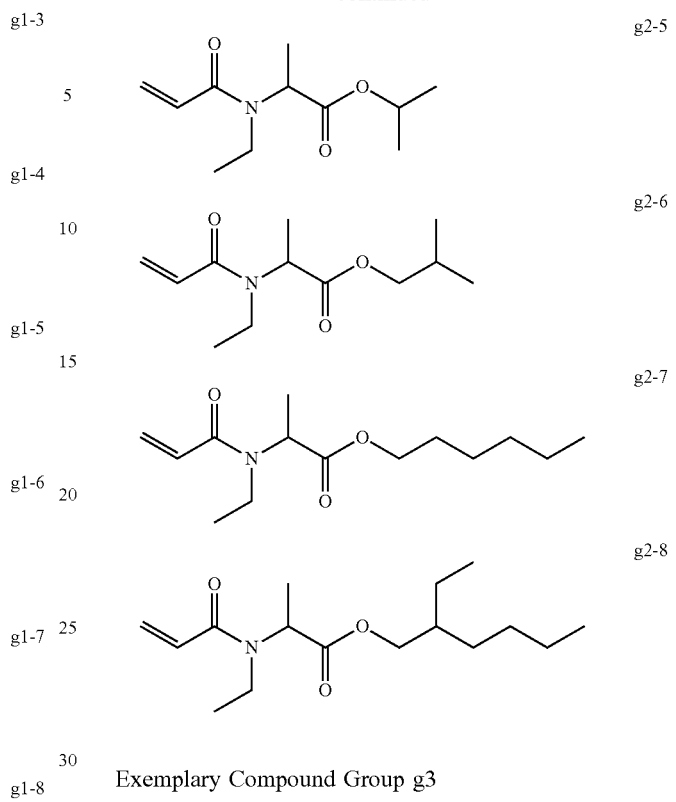
Exemplary Compound Group g3
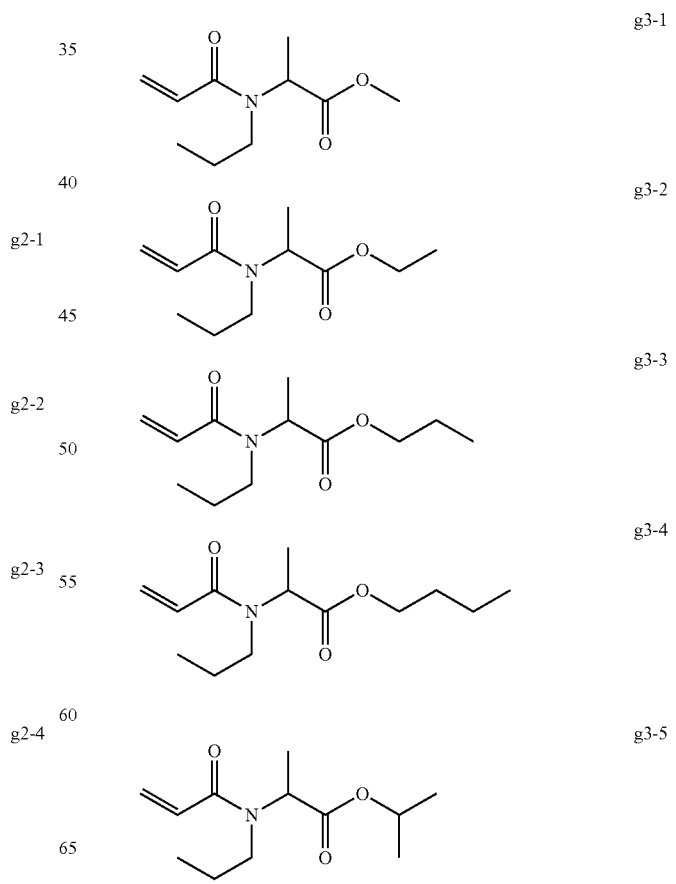

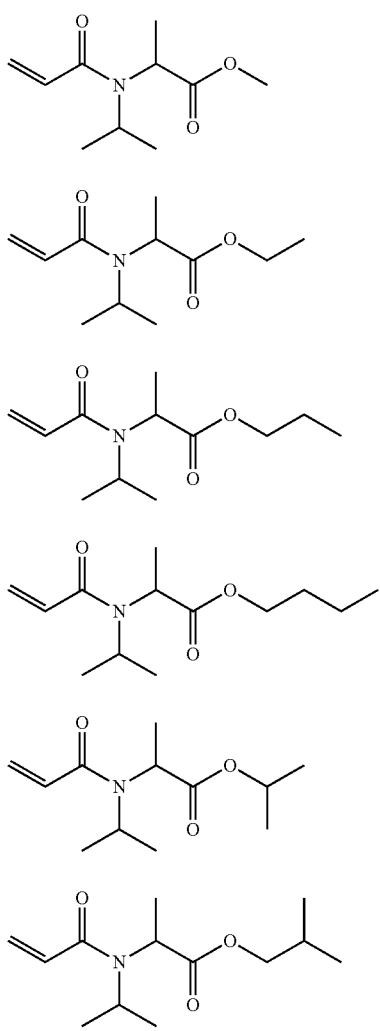
Exemplary Compound Group g4
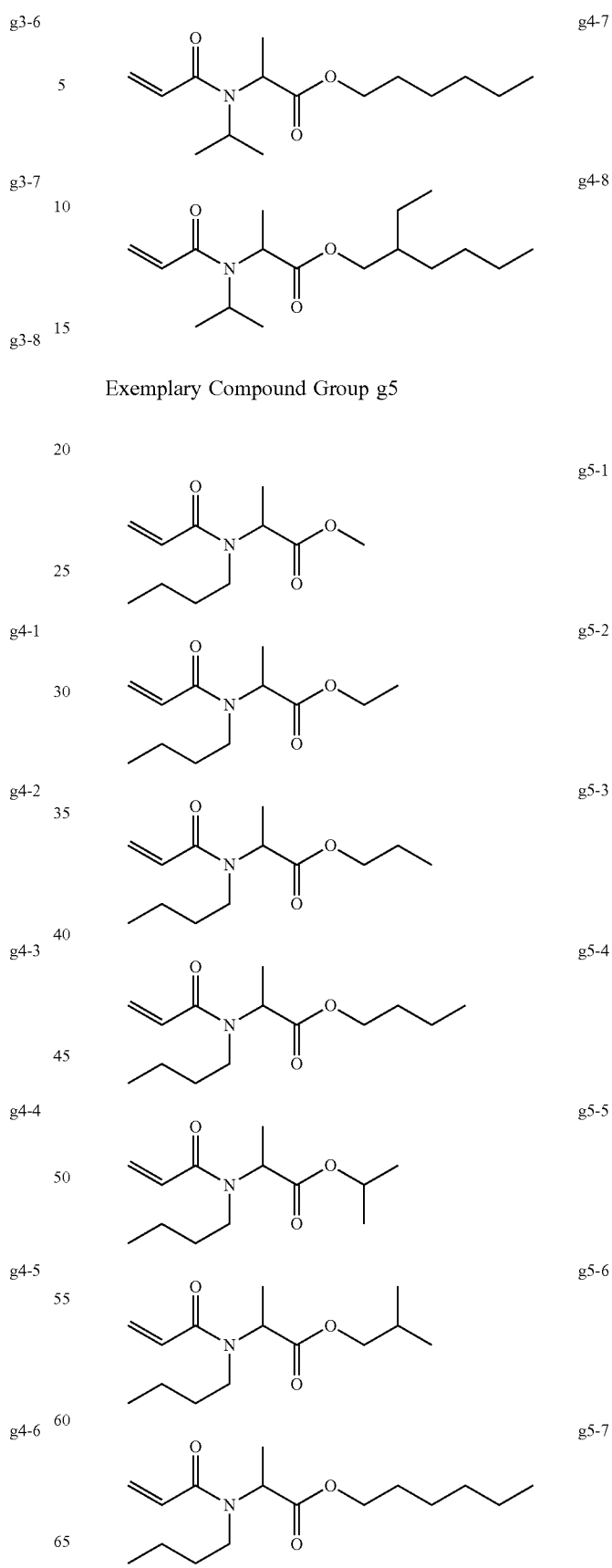
Exemplary Compound Group g5

-continued

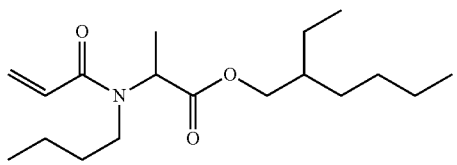
g5-8

Exemplary Compound Group g6

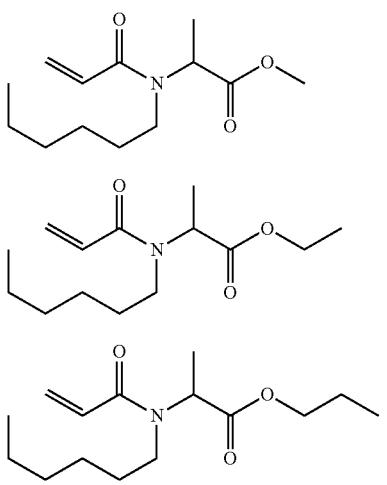

g6-1 g6-2 g6-3 g6-4

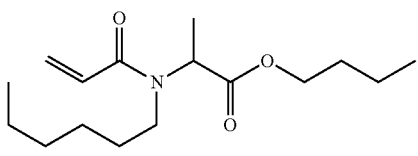
g6-5

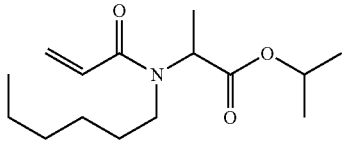
g6-6

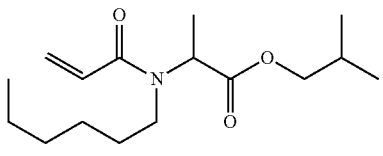
g6-7

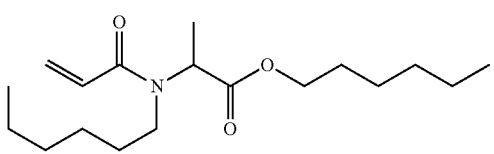
g6-8

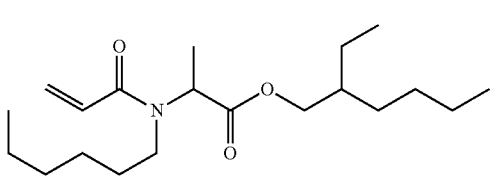

Examples of the group h include, but are not limited to, compounds of the following group h1. These can be used alone or in combination.

Exemplary Compound Group h1

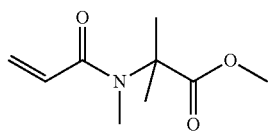
h1-1

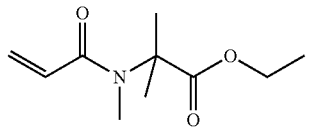
h1-2

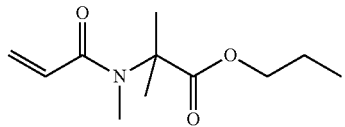
h1-3

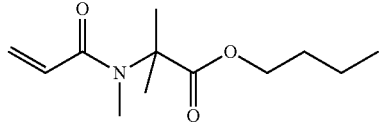
h1-4

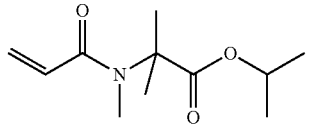
h1-5

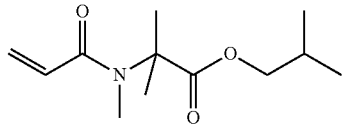
h1-6

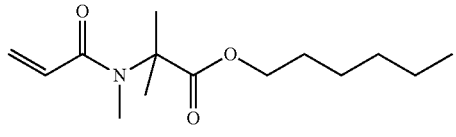
h1-7

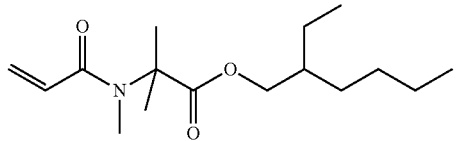
h1-8

Examples of the group i include, but are not limited to, compounds of the following groups i1 and i2. These can be used alone or in combination.

Exemplary Compound Group i1

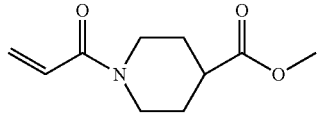
i1-1

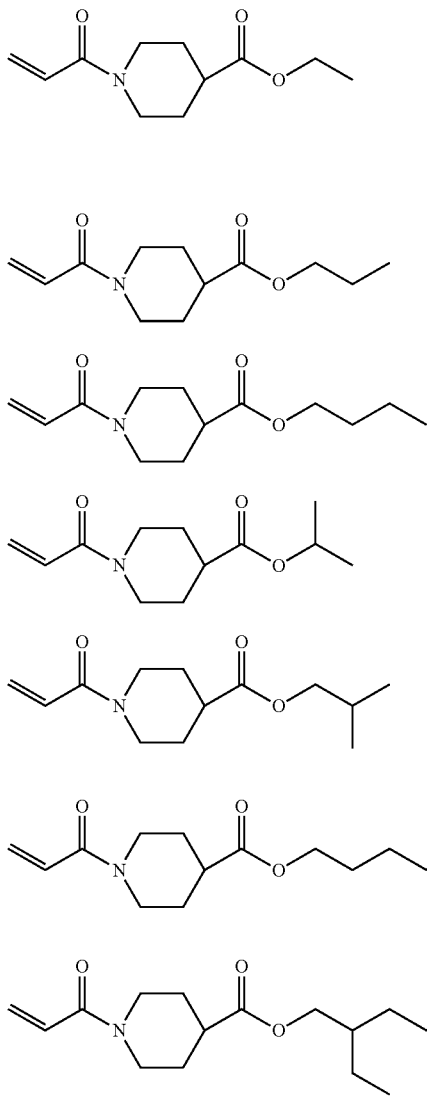

Exemplary Compound Group i2

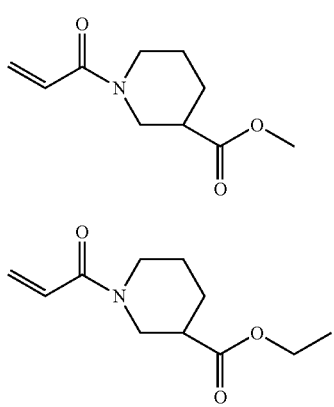

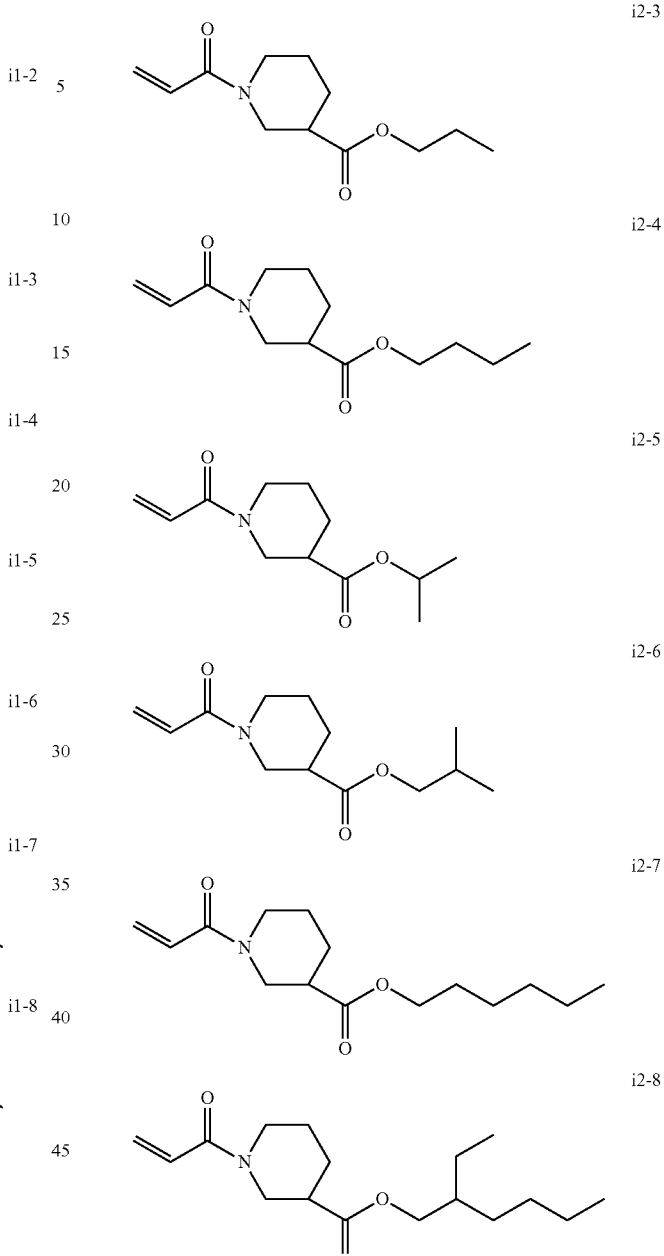

Of the exemplary compounds of the group a to the group i, exemplary compound a1-1, exemplary compound a1-4, exemplary compound a6-1, exemplary compound d1-1, exemplary compound d1-2, exemplary compound d1-4, exemplary compound d1-5, exemplary compound d3-2, exemplary compound d4-1, exemplary compound d4-5, exemplary compound d6-1, exemplary compound d6-4, exemplary compound g1-1, exemplary compound g1-2, and exemplary compound g1-5 are preferable. The exemplary compound d1-1, the exemplary compound d1-2, the exemplary compound g1-1, the exemplary compound g1-2, the exemplary compound g1-5, the exemplary compound i1-2, and the exemplary compound i2-2 are more preferable in terms of curability.

Polyfunctional Polymerizable Compound B1 Having Stimulation Index SI Value of 3 or Less The polyfunctional polymerizable compound B1 having a stimulation index SI value of 3 or less is not particularly limited and can be suitably selected to suit to a particular application.

Specific examples include, but are not limited to, ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol di(meth)acrylate, neopentyl glycol di(meth)acrylate, ethoxylated neopentyl glycol di(meth)acrylate), propoxylated neopentyl glycol di(meth)acrylate, 1,6-hexanediol di(meth)acrylate, 1,9-nonanediol di(meth)acrylate, pentaerythritol tri(meth)acrylate, pentaerythritol tetra(meth)acrylate, dipentaerythritol hexa(meth)acrylate, and trimethylolpropane tri(meth)acrylate. In addition, (meth)acrylic acid ester means acrylic acid ester or methacrylic acid ester, and the same applies to (meth)acrylate. These can be used alone or in combination.

Examples of the polyfunctional polymerizable compound B1 having a stimulation index SI value of 3 or less include, but are not limited to, urethane (meth)acrylate derivatives obtained by reacting a compound having an isocyanate group with a (meth)acrylic acid ester having a hydroxy group and epoxy (meth)acrylate derivatives obtained by reacting a compound having an epoxy group with (meth)acrylic acid.

In addition to the derivatives of (meth)acrylic acid, vinyl ethers such as diethylene glycol divinyl ether, triethylene glycol divinyl ether, and cyclohexane dimethanol divinyl ether and allyl compounds such as diallyl phthalate and triallyl trimellitate.

The proportion of the polyfunctional polymerizable compound B1 having a stimulation index SI value of 3 or less is preferably from 1.0 to 60.0 percent by mass, more preferably from 5.0 to 40.0 percent by mass, and furthermore preferably from 10.0 to 30.0 percent by mass of the composition. Further, the polyfunctional polymerizable compound B1 having a skin sensitizing SI value of 3 or less can be used alone or in combination.

The curability and viscosity of the composition and hardness and attachability of cured matter can be easily adjusted to suit to a particular application by a combinational use with the polyfunctional polymerizable compound B1 having a stimulation index SI value of 3 or less.

Polymerization Initiator C1 Having No Maximum Absorption Peak at 365 to 405 nm

The polymerization initiator C1 having no maximum absorption peak at 365 to 405 nm is not particularly limited and can be suitably selected to suit to a particular application. Specific examples include, but are not limited to, benzophenone, acetophenone, 2-hydroxy-2-phenylacetophenone, 2-ethoxy-2-phenyl acetophenone, 2-methoxy-2-phenyl acetophenone, 2-isopropoxy-2-phenyl acetophenone, 2-isobutoxy-2-phenyl acetophenone, 4-methoxy acetophenone, 4-benzyloxy acetophenone, 4-phenyl acetophenone, 4-benzoyl 4'-methyl diphenyl sulfide, methyl benzoylformate, an oligomer [benzene, (1-methylethynyl)-, homopolymer, and ar-(2-hydroxy-2-methyl-1-oxopropyl) derivative] (Esacure ONE, manufactured by IGM Resins B.V.). These can be used alone or in combination.

The polymerization initiator C1 having no maximum absorption peak at 365 to 405 nm is a hydrogen abstraction type polymerization initiator having a benzophenone backbone and has no absorption sensitivity to the wavelength of an ultraviolet emission diode having emission peak wavelengths of 365 nm, 385 nm, 395 nm, or 405 nm.

The proportion of the polymerization initiator C1 having no maximum absorption of from 365 to 405 nm of the total content of ink is preferably from 1 to 20 percent by mass, more preferably from 3 to 15 percent by mass, and furthermore preferably from 5 to 10 percent by mass.

The mass ratio of the content of the acrylamide compound represented by Chemical formula 1 or 2 to the content of the polymerization initiator C1 having no maximum absorption peak in the wavelength range of from 365 to 405 nm of the composition is preferably from 5 to 25, more preferably from 8 to 20, and furthermore preferably from 9 to 19.

Hydrogen Donor D

The photopolymerizable composition of the present disclosure initiates polymerization at the following polymerization initiation mechanism by a compound having a benzophenone or other backbone. That is, a compound having a benzophenone or other skeleton is brought into an excited state by light irradiation. Thereafter, the excited molecule extracts hydrogen from a nearby compound, a radical is generated on the compound from which the hydrogen has been extracted, and the radical becomes an initiation point of radical polymerization. As a result, the compound having a benzophenone or other backbone functions as a photoradical polymerization initiator. That is, if there is a compound from which hydrogen is extracted together with a compound having a benzophenone or other backbone, polymerization initiates by the above-described polymerization initiation mechanism. Therefore, if hydrogen is extracted from the radically polymerizable compound used in the present disclosure, polymerization may start therefrom.

On the other hand, the photopolymerizable composition of the present disclosure may further co-exist with a hydrogen-donating compound from which hydrogen is easily extracted. In that case, hydrogen can be transferred more smoothly from the hydrogen-donating compound to the compound molecule having a benzophenone or other backbone excited upon light irradiation, and the polymerization can proceed more efficiently. That is, the addition of the polymerization initiator C1 having no maximum absorption peak in the range of from 365 to 405 nm significantly improves polymerization reactivity while low yellow discoloration is maintained.

The hydrogen donating compound used in the present disclosure smoothly supplies hydrogen to a compound molecule having a benzophenone or other backbone excited upon light irradiation.

Specific examples of such compounds include, but are not limited to, compounds having an amino group such as diethylamine, diphenylamine, triethylamine, tributylamine, diethanolamine, triethanolamine, N,N-diethyl ethanol amine, N,N-diethyl methylamine, dipropylamine, N,N-dimethyl aniline, p-diethylamino ethyl benzoate, and p-dimethyl amino ethyl benzoate, compounds having a hydroxyl group such as methanol, ethanol, propanol, isopropyl alcohol, butanol, ethylene glycol, propylene glycol, butanediol, and phenol, compounds having an ether bond such as tetrahydrofuran, tetrahydropyran, dioxane, trioxane, diethylene glycol, dipropylene glycol, propylene glycol monomethyl ether, and propylene glycol monomethyl ether acetate, mercapto compounds such as butanethiol, propanethiol, hexanedithiol, decanedithiol, n-dodecylmercaptan, dodecyl (4-methylthio) phenyl ether, benzenethiol, 4-dimethylmercapto benzene, 2-mercaptoethanol, 1-mercapto-2-propanol, 3-mercapto-2-butanol, 3-mercapto-1,2-propanediol, and mercapto phenol and disulfides obtained by oxidizing these, butyl thioglycolate, ethylene glycol bisthioglycolate, ethylene glycol bisthiopropionate, butanediol bis (3-mercaptoisobutyrate), 1,4-butanediol bisthioglycolate, 1,4-butanediol bisthiopropionate, octyhl β-mercaptopropionic acid, methoxybutyl β-mercaptopropionic acid, trishydroxyethyl tristhiopropionate, trimethylolpropane tris (3-mercaptoisobutyrate), trimethylolpropane tris (3-mercapto butyrate), trimethylol propane tris(3-mercaptopropionate), trimethylolpropane tris(β-thiopropionate), trimethylol propane tristhioglycolate, trimethylol propane tris thiopropionate, pentaerythritol tetrakis(3-mercaptopropionate), pentaerythritol tetrakisthioglycolate, pentaerythritol tetrakisthiopropionate, thioglycolic acid, thiosalicylic acid, thiomalic acid, mercaptoacetic acid, 2-mercapto ethanesulfonic acid, 2-mercapto nicotinic acid, 2-mercapto propionic acid, 3-mercapto propane sulfonic acid, 3-mercapto propionic acid, 3-mercapto butyric acid, 4-mercapto butane sulfonic acid, 3-[N-(2-mercaptoethyl)amino]propionic acid, 3-[N-(2-mercaptoethyl) carbamoyl]propionic acid, 2-mercapto-3-pyridinol, 2-mercapto imidazole, 2-mercapto ethylamine, 2-mercapto benzimidazole 2-mercapto benzothiazole, 6-trimercapto-s-triazine, N-(2-mercaptopropionyl) glycine, N-(3-mercaptopropionyl)alanine, diisopropylthioxanthone, diethylthioxanthone, thiophosphites, and trimercapto propionic acid tris (2-hydroxyethyl) isocyanurate.

Compounds having an amino group are particularly preferably used in terms that the energy of transferring hydrogen is low. Of these, more preferred specific examples include, but are not limited to, 2-(N,N-dimethylamino) methyl benzoate, 4-(N,N-dimethylamino) ethyl benzoate, 4-(N,N-diethylamino) ethyl benzoate, and a mixture (Speedcure 7040, manufactured by Lambson Group Ltd.) of 1,3-di({α-4-(dimethylamino)benzoylpoly[oxy(1-methylethylene)]}oxy)-2,2-bis({α-4-(dimethylamino)benzoylpoly[oxy(1-methylethylene)]oxymethyl) propane and {α-4-(dimethylamino)benzoylpoly(oxyethylene)-poly [oxy(1-methylethylene))]-poly(oxyethylene)4-(dimethylamino) benzoate.

When the hydrogen donor is used in the present disclosure, the proportion of the hydrogen donor of the radically polymerizable compound in the photopolymerizable composition is from 0.01 to 50 percent by mass and preferably from 0.1 to 20 percent by mass.

Monofunctional Polymerizable Compound A2 Other Than Acrylamide Compound A1 An example of the polymerizable compound A2 other than the acrylamide compound A1 is a known polymerizable monomer represented by (meth)acrylic acid ester. Specific examples include, but are not limited to, methyl(meth)acrylate, ethyl(meth)acrylate, n-butyl(meth)acrylate, allyl(meth)acrylate, glycidyl(meth)acrylate, 2-(dimethylamino)ethyl(meth)acrylate, 2-hydroxyethyl(meth)acrylate, 2-butoxyethyl(meth)acrylate, ethyl carbitol(meth)acrylate, cyclohexyl(meth)acrylate, tetrahydrofurfuryl (meth)acrylate, 2-(2-vinyloxyethoxy) ethyl (meth)acrylate, benzyl (meth)acrylate, 2-phenoxyethyl (meth)acrylate, 2-hydroxy-3-phenoxypropyl (meth)acrylate, isobornyl (meth)acrylate. In addition, (meth)acrylic acid ester means acrylic acid ester or methacrylic acid ester, and the same applies to (meth)acrylate.

Examples of the polymerizable compound A2 other than the acrylamide compound A1 include, but are not limited to, urethane (meth)acrylate derivatives obtained by reacting a compound having an isocyanate group with a (meth)acrylic acid ester having a hydroxy group and epoxy (meth)acrylate derivatives obtained by reacting a compound having an epoxy group with (meth)acrylic acid.

In addition to (meth)acrylic acid derivatives, it is possible to use N-vinyl compounds such as N-vinylcaprolactam, N-vinylpyrrolidone, and N-vinylformamide, aromatic vinyl compounds such as styrene and α-methylstyrene, vinyl ethers such as diethylene glycol vinylethers, triethylene glycol divinyl ether, and cyclohexane dimethanol divinyl ether, and allyl compounds such as allyl glycidyl ether, diallyl phthalate, and triallyl trimellitate.

In addition, the acrylamide compound containing no ester structure can be used as other polymerizable compound A2.

The proportion of the polymerizable compound A2 other than the acrylamide compound A1 of the composition is preferably contained from 1.0 to 60.0 percent by mass and more preferably from 5.0 to 40.0 percent by mass. The polymerizable compound A2 other than the acrylamide compound A1 can be used alone or in combination.

The curability and viscosity of the composition and hardness and attachability of cured matter can be easily adjusted to suit to a particular application by a combinational use with the polymerizable compound A2 other than the acrylamide compound A1.

Other Polymerization Initiator C2 Other Than Polymerization Initiator C1 Having No Maximum Absorption Peak in Wavelength Range of from 365 to 405 nm The polymerization initiator C2 other than the polymerization initiator C1 having no maximum absorption peak in the wavelength range of from 365 to 405 nm is an α-aminoketone-based polymerization initiator. Such a compound has an absorption sensitivity to the wavelength of an ultraviolet light emitting diode having an emission peak wavelength of 365 nm, 385 nm, 395 nm, or 405 nm. Acylphosphine oxide-based polymerization initiators and α-aminoketone-based polymerization initiators are known as the polymerization initiator having an absorption sensitivity to these emission peak wavelengths. However, compounds such as bis(2,4,6-trimethylbenzoyl)-phenylphosphine oxide (Irgacure 819) known as an acylphosphine oxide-based polymerization initiator are not easily soluble in the acrylamide compounds having an ester structure for use in the composition of the present disclosure.

Therefore, when an active energy ray-curable composition containing a polymerization initiator having poor solubility as described above is irradiated with ultraviolet light having an emission peak at a wavelength of from 365 nm to 405 nm using an ultraviolet light emitting diode, it is difficult to obtain practical curability.

On the other hand, the polymerization initiator C1 having no maximum absorption peak in the wavelength range of from 365 to 405 nm has excellent solubility in the acrylamide compound having an ester structure for use in the composition of the present disclosure. Therefore, when the active energy ray-curable composition containing the acrylamide compound represented by Chemical formula 1 or 2 having an ester structure is irradiated with an ultraviolet light emitting diode, practical curability is obtained.

The other polymerization initiators include a thermal polymerization initiator and a photopolymerization initiator.

The photopolymerization initiator produces active species such as a radical or a cation upon application of energy of an active energy ray and initiates polymerization of a polymerizable compound (monomer or oligomer). Known radical polymerization initiators, cation polymerization initiators, base producing agents, or combinations thereof can be used as the photopolymerization initiator. Of these, the radical polymerization initiator is preferable.

Specific examples of the radical polymerization initiators include, but are not limited to, aromatic ketones, acylphosphineoxide compounds, aromatic oniumchlorides, organic peroxides, thio compounds (thioxanthone compounds, thiophenyl group containing compounds, etc.), hexaarylbiimidazole compounds, ketoxime-esterified compounds, borate compounds, azinium compounds, metallocene compounds, active ester compounds, compounds having a carbon halogen bond, and alkylamine compounds.

Specific examples include, but are not limited to, 2-benzyl-2-dimethylamino-1-4-morpholinophenyl)-butanone-1 (Irgacure 369), bis(2,4,6-trimethyl benzoyl)phenylphosphine oxide (Irgacure 819), 2,4,6-trimethyl benzoyl diphenylphosphine oxide (Irgacure TPO), polyethylene glycol 200-di(β-4 (4-(2-dimethyl amino-2-benzyl)butanonylphenyl)piperazine (Omnipol 910, manufactured by IGM Resins B.V.), and 1,3-di({α-[1-chloro-9-oxo-9H-thioxanthen-4-yl)oxy]acetylpoly[oxy(1-methylethylene)]{oxy)-2,2-bis({α[1-chloro-9-oxo-9H-thioxanthen-4-yl)oxy]acetyl poly[oxy(1-methylethylene)]{oxymethyl)propane (Speedcure 7010, manufactured by Lambson Group Ltd.).

The proportion of the polymerization initiator C2 other than the polymerization initiator C1 having no maximum absorption in the wavelength of from 365 to 405 nm of the total amount of the composition is preferably from 0.1 to 5 percent by mass and more preferably from 0.5 to 3 percent by mass.

The curability and viscosity of the composition and hardness and attachability of cured matter can be easily adjusted to suit to a particular application by a combinational use with the polymerization initiator C2 other than the polymerization initiator C1 having no maximum absorption in the wavelength range of from 365 to 405 nm.

The composition of the present disclosure may further contain a sensitizer in order to promote the decomposition of the polymerization initiator upon irradiation with active energy rays.

The sensitizer absorbs the active energy rays, becomes electronically excited, then, in this state, comes into contact with the polymerization initiator, and accelerates a chemical change (decomposition or production of radical, acid, or base) of the polymerization initiator due to the action such as electron transfer, energy transfer, and heat generation. The mass ratio of the sensitizer to the photopolymerization initiator is preferably from $5 \times 10^{-3}$ to 200 and is more preferably from 0.02 to 50.

The sensitizer is not particularly limited and can be suitably selected to suit to a particular application. A sensitizing dye having an absorption wavelength in the wavelength range of from 350 to 450 nm can be used.

Specific examples include, but are not limited to, polynuclear aromatics (e.g., pyrene, perylene, and triphenylene), xanthenes (e.g., fluorescein, eosin, erythrosine, rhodamine B, and rose bengal), cyanines (e.g., thiacarbocyanine, and oxacarbocyanine), merocyanines (e.g., merocyanines and carbomerocyanines), thiazines (e.g., thionin, methylene blue, and toluidine blue), acridines (e.g., acridine orange, chloroflavin, and acriflavine), anthraquinones (e.g., anthraquinone), squaryliums (e.g., squarylium), and coumarins (e.g., 7-diethylamino-4-methylcoumarin).

The composition of the present disclosure may further contain a co-sensitizer. The co-sensitizer further improves the sensitivity of the sensitizing dye to active energy rays and reduces the polymerization inhibition of the polymerizable compound ascribable to oxygen.

The co-sensitizer is not particularly limited and can be suitably selected to suit to a particular application.

Specific examples include, but are not limited to, amine-based compounds such as triethanolamine, p-dimethylamino benzoic acid ethyl ester, p-formyl dimethylaniline, and p-methylthiodimethylaniline, thiol such as 2-mercapto benzothiazole, 2-mercapto benzoxazole, 2-mercaptobenz imidazole, 2-mercapto-4(3H)-quinazoline, and β-mercaptonaphthalene, and sulfides.

The composition of the present disclosure may further contain a polymerization inhibitor. Due to this, the storage property (storage stability) of the composition can be improved. Also, clogging of the head due to thermal polymerization can be prevented when the composition is heated to lower the viscosity and thereafter discharged.

The polymerization inhibitor is not particularly limited and can be suitably selected to suit to a particular application. Specific examples include, but are not limited to, hydroquinone, benzoquinone, p-methoxyphenol, TEMPO, TEMPOL, and a cupron complex of aluminum. The proportion of the polymerization inhibitor of the total amount of the composition is preferably from 200 to 20,000 ppm.

Other Components

The composition of the present disclosure may further optionally contain other components such as a coloring material, an organic solvent, a stabilizer, a plasticizer, a thickener, a preservative, a heat dissipating agent, a biocompatible substance, and a fiber-reinforced material.

Depending on the objectives and requisites of the composition of the present disclosure, various pigments and dyes can be used, which impart black, white, magenta, cyan, yellow, green, orange, and gloss color such as gold and silver, as the coloring material.

The content of the coloring material is not particularly limited and determined considering the desired color density and dispersibility of the coloring material of the composition. It is preferable that the proportion of the coloring material of the total amount of the composition be preferably from 0.1 to 20 percent by mass. The composition of the present disclosure does not necessarily include a coloring material but can be clear and colorless.

If no coloring material is included, the composition is suitable as an overcoat layer to protect an image.

As the pigment, an inorganic or organic pigment can be used alone or in combination.

Specific examples of the inorganic pigment include, but are not limited to, carbon blacks (C.I. Pigment Black 7) such as furnace black, lamp black, and acetylene black, and channel black, iron oxides, and titanium oxides.

Specific examples of the organic pigment include, but are not limited to, azo pigments such as insoluble azo pigments condensed azo pigments, azo lakes, chelate azo pigments, polycyclic pigments such as phthalocyanine pigments, perylene pigments, perinone pigments, anthraquinone pigments, quinacridone pigments, dioxazine pigments, thioindigo pigments, isoindolinone pigments, and quinofuranone pigments, dye chelates such as basic dye type chelates, acid dye type chelates, dye lakes such as basic dye type lake and acid dye type lake, nitro pigments, nitroso pigments, aniline black, and daylight fluorescent pigments.

In addition, a dispersant is optionally added to enhance the dispersibility of a pigment. The dispersant has no particular limit and can be, for example, polymer dispersants conventionally used to prepare a pigment dispersion material.

The dye includes, for example, an acidic dye, a direct dye, a reactive dye, a basic dye, and a combination thereof.

Organic Solvent

The composition of the present invention may contain an organic solvent, but if possible, it is preferred that the composition be free of an organic solvent. The curable composition free of an organic solvent, in particular volatile organic compound (VOC), is preferable because it enhances safety at where the composition is handled and makes it possible to prevent pollution of the environment. The organic solvent represents a conventional non-reactive organic solvent, for example, ether, ketone, xylene, ethylacetate, cyclohexanone, and toluene, which is clearly distinguished from reactive monomers. Furthermore, "free of" an organic solvent means that no organic solvent is substantially included. The proportion thereof is preferably less than 0.1 percent by mass.

Plasticizers can impart flexibility to polymers formed from monomers.

Specific examples include, but are not limited to, polyethylene glycol esters, end-capped polyesters, butyl stearate, lauric acid, dioctyl glutarate, triglycerides, dioctyl oxalate, triethyl phosphate, and acetyl tributyl citrate.

Specific examples of the thickener include, but are not limited to polycyanoacrylate, polylactic acid, polyglycolic acid, polycaprolactone, polyacrylic acid alkyl esters, and polymethacrylic acid alkyl esters.

The preservative includes a typically-used product that prevents initialization of polymerization of monomers. Specific examples include, but are not limited to, potassium sorbate, sodium benzoate, sorbic acid, and chlorocresol.

The fiber reinforced material is not particularly limited and includes natural or synthetic rubber of styrene, acrylonitrile, and other substances to reinforce the impact resistance of the composition.

The stabilizer prevents polymerization of the monomer during storage and includes anionic stabilizers and free radical stabilizers. The former includes, but is not limited to, metaphosphoric acid, maleic acid, maleic anhydride, alkylsulfonic acid, phosphorus pentoxide, iron (III) chloride, antimony oxide, 2,4,6-trinitrophenol, thiol, alkylsulfonyl, alkylsulfone, alkylsulfoxide, alkyl sulfites, sultones, sulfur dioxide, and sulfur trioxide, and the latter includes, but is not limited to, hydroquinone, catechol, and derivatives thereof.

Preparation of Active Energy Ray Curable Composition

The active energy ray curable composition of the present disclosure can be prepared by using the components described above. The preparation devices and conditions are not particularly limited. An example of the preparation is charging the acrylamide compound represented by Chemical formula 1, urethane (meth)acrylate having an SI value of 3.0 or greater, a polymerization initiator having a molecular weight of 800 or more, a pigment, a dispersant, and optional other substances into a dispersing machine such as a ball mill, a kitty mill, a disc mill, a pin mill, and a Dyno mill to prepare a pigment liquid dispersion, and admixing it with substances such as a polymerization initiator and a surfactant.

Viscosity

The viscosity of the active energy ray curable composition of the present disclosure has no particular limit because it can be adjusted depending on the purpose and application devices. For example, if a discharging device that discharges the composition from nozzles is used, the viscosity thereof is preferably in the range of from 3 mPa·s to 40 mPa·s, more preferably from 5 mPa·s to 15 mPa·s, and particularly preferably from 6 mPa·s to 12 mPa·s in the temperature range of from 20 degrees C. to 65 degrees C., preferably at 25 degrees C. In addition, it is particularly preferable to satisfy this viscosity range without including the organic solvent mentioned above. The viscosity can be measured by a cone-and-plate type rotary viscometer (VISCOMETER TVE-22L, manufactured by TOKI SANGYO CO., LTD.) using a cone rotor (1°34'×R24) at a rate of rotation of 50 rpm with a setting of the temperature of hemathermal circulating water in the range of from 20 degrees C. to 65 degrees C. VISCOMATE VM-150III can be used for the temperature adjustment of the circulating water.

Curing Device

The curable composition of the present disclosure is cured by heating or irradiation of active energy rays. Curing with active energy rays is preferable.

Active energy rays for use in curing an active energy ray curable composition of the present disclosure are not particularly limited, for example, they are preferred when they can impart energy to conduct polymerization reaction of polymerizable components in the curable composition.

Specific examples thereof include, but are not limited to, electron beams, α ray, β ray, γ ray, and X ray, in addition to ultraviolet rays. Preferably, in another embodiment, a particularly high energy light source obviates the need for a polymerization initiator to proceed reaction. In addition, in the case of irradiation with ultraviolet rays, mercury-free is strongly preferred in terms of protection of environment. Therefore, replacement with GaN-based ultraviolet light-emitting devices is preferred from industrial and environmental point of view. Furthermore, ultraviolet light-emitting diode (UV-LED) and ultraviolet laser diode (UV-LD) are preferable as ultraviolet ray light source because they have small sizes, long working life, high efficiency, and high cost performance.

Of these, ultraviolet rays having a peak in the wavelength range of from 285 to 405 nm (preferably from 365 to 405 nm) emitted from an ultraviolet ray emitting diode (hereinafter also referred to as a UV-LED) are preferable in terms of energy saving and miniaturization of the device. The light absorption spectrum of a polymerization initiator is generally broad. Usage of a UV-LED that emits light having a narrow specific wavelength range makes it difficult to improve curability of the composition. Therefore, the composition of the present disclosure having excellent curability is preferable even when a UV-LED is used.

Application Field

The application field of the active energy ray curable composition of the present disclosure is not particularly limited. It can be applied to any field where the active energy ray curable composition is used. For example, the curable composition is selected to a particular application and used for a resin for processing, a paint, an adhesive, an insulant, a releasing agent, a coating material, a sealing material, various resists, and various optical materials.

Furthermore, the active energy ray curable composition of the present disclosure can be used as the ink of the present disclosure that contains the composition of the present disclosure to form two-dimensional texts, images, and designed coating film on various substrates and in addition as a solid object forming material to form a three-dimensional object. This material for a solid freeform fabrication can be used as a binder for powder particles for use in powder additive manufacturing to form a solid object by repeating curing and laminating powder layers. Also, it can be used as a solid object constituting material (model material) or supporting member (supporting material) for use in additive manufacturing (stereolithography) as illustrated in FIG. 1 and FIGS. 2A to 2D. FIG. 1 is a diagram illustrating a method of additive manufacturing to sequentially form layers of the active energy ray curable composition of the present disclosure one on top of the other by repeating discharging the curable composition to selective regions followed by curing upon irradiation of an active energy ray.

FIGS. 2A to 2D are each diagrams illustrating a method of additive manufacturing to sequentially form cured layers 6 having respective predetermined forms one on top of the other on a movable stage 3 by irradiating a storing pool (storing part) 1 of the active energy ray curable composition 5 of the present disclosure with an active energy ray 4.

An apparatus for fabricating a three-dimensional object by the active energy ray curable composition of the present disclosure is not particularly limited and can be a known apparatus.

For example, the apparatus includes a containing device, a supplying device, and a discharging device, and an active energy ray irradiator of the curable composition.

In addition, the present disclosure includes cured materials obtained by curing the active energy ray curable composition and processed products obtained by processing structures having the cured materials formed on a substrate. The processed product is fabricated by, for example, heating drawing and punching cured materials and structures having a sheet-like form or film-like form when surface-processing after decorating is suitable. Examples thereof are gauges or operation panels of vehicles, office machines, electric and electronic machines, and cameras.

The substrate is not particularly limited. It can suitably be selected to a particular application. Examples thereof include fiber, fabrics, leather, metal, plastic, glass, wood, ceramic, or composite materials thereof. Of these, plastic substrates are preferred in terms of processability.

Furthermore, the composition of the present disclosure forms not only two-dimensional texts and images and design coating films on various substrates, but also, a cured product obtained by curing the composition and an artificial nail obtained by processing the cured product to form a structure on nail or a plastic substrate having a nail-like form. Since the composition of the present disclosure has excellent removability and nail attachability, it is particularly suitable as a base coat for an artificial nail composition.

Artificial Nail Composition, Nail Decorative Material, and Artificial Nail

The artificial nail composition of the present disclosure contains the composition of the present disclosure, and other optional components.

A suitable amount of a colorant such as a pigment and a dye, an inorganic filler such as metal powder, calcium carbonate, talc, silica, alumina, and aluminum hydroxide, and additives such as an flame retardant, an organic filler, an antioxidant, a polymerization inhibitor, a defoaming agent, a coupling agent, a leveling agent, and a rheology control agent can be added to the artificial nail composition of the present disclosure as long as the properties of the present disclosure are not impaired.

The nail decorative material includes substances such as nail polish, pedicure, sculpture, and gel nail for decorating or reinforcing nails.

Artificial nails include products that form fake nails made of synthetic resin on natural nail.

The artificial nail composition of the present disclosure is applied to a human or animal nail or other artificial nail followed by exposure to light to form an artificial nail. Further, the artificial nail formed by the artificial nail composition of the present disclosure can be removed by a removing method using a substance such as an organic solvent.

The artificial nail of the present disclosure refers to a layer formed on a human or animal nail or on other artificial nail for the purpose of cosmetics and/or protection. Further, it includes a free-form resin substrate (fake nail) for the purpose of dressing and/or protecting the nail as the other artificial nail.

In addition, "human and animal nails and other artificial nails" are also simply referred to as "nail".

The shape of the artificial nail is not particularly limited and the artificial nail can be desirably shaped. For example, it may be formed so as to cover the surface of the nail, may be formed only on a part of the nail, may be formed into a larger form than the nail by using nail foam to extend the nail.

Further, the thickness of the artificial nail composition of the present disclosure can be controlled by application. The thickness of the entire artificial nail is not particularly limited as long as it is generally within a range for an artificial nail. It is preferably from 10 to 2,000 in terms of durability and removability.

Such an artificial nail typically employs a configuration having at least one layer of a primer layer (a layer between the nail and a base layer for enhancing attachability when the attachment force of the nail is insufficient only with the base layer), a base layer (layer between nail and color layer to enhance attachment and prevent color transfer to nail), a color layer (layer containing a coloring material), and a top layer (outermost layer to improve durability, gloss, and aesthetics) in the sequence from the nail. The artificial nail composition of the present disclosure can be suitably applied to any of the base layer, the color layer, and/or the top layer.

Above all, it is preferable that the layer obtained by curing the artificial nail composition of the present disclosure be in contact with the nail in terms of durability and removability.

In addition, an artificial nail layer formed by the artificial nail composition of the present disclosure may have a primer layer, a base layer, a color layer, and/or top layer can be separately provided to the upper layer (the surface opposite to the nail with respect to the artificial nail layer) or the lower layer (the surface between the artificial nail layer and the nail) for the purpose of imparting color, gloss, and/or attachability.

The artificial nail composition of the present disclosure is a photocurable artificial nail composition (also referred to as "artificial nail composition for gel nail") as a nail decorative material. It is also curable upon irradiation of active energy rays.

Composition Accommodating Container

The composition accommodating container of the present disclosure contains the active energy ray curable composition or the ink of the present disclosure containing the active energy ray curable composition of the present disclosure (i.e., when the composition is used as the ink) and is suitable for the applications as described above. The container accommodating the active energy ray curable composition or the ink of the present disclosure can be used as a composition or ink cartridge and a composition or ink bottle. This obviates the need for direct contact with the composition or the ink during operations such as conveyance and replacement of the composition or the ink, which prevent fingers and clothes from being contaminated. Furthermore, inclusion of foreign matters such as dust in the composition or the ink can be also prevented. In addition, the container has no particular limit. Size, form, and material of the container can be suitably selected to suit to a particular application and usage. For example, it is preferable to use a light blocking material to block the light or cover the container with a light blocking sheet, etc.

Image Forming Method and Image Forming Apparatus

The two or three dimensional image forming method of the present disclosure includes applying or discharging the composition or the ink of the present disclosure and curing the discharge or applied composition. The step of applying the composition or the ink of the present disclosure is not particularly limited and the composition or the ink can be applied by an applicator such as a brush. Alternatively, the composition or the ink of the present disclosure can be discharged. In the curing step, the composition or the ink can be cured by an active energy ray or heat. To cure the composition or the ink of the present disclosure with an active energy ray, the image forming method of the present disclosure includes irradiating the composition of the present disclosure with an active energy ray to cure the composition or the ink. The two or three dimensional image forming apparatus of the present disclosure includes an irradiator to irradiate the composition or the ink of the present disclosure with an active energy ray and a storage unit to store the composition or the ink of the present disclosure, which may accommodate the composition accommodating container of the present disclosure. Furthermore, the method and the apparatus may furthermore optionally include applying the composition or the ink of the present disclosure with an applicator such as a brush, an application device executing the applying or discharging the composition or the ink of the present disclosure and a discharging device executing the discharging. The method of discharging the composition or the ink is not particularly limited. Examples include, but are not limited to, a continuous spraying method and an on-demand method. The on-demand method includes a piezo method, a thermal method, an electrostatic method, etc.

FIG. 1 is a schematic diagram illustrating another example of the image forming apparatus (apparatus to fabricate a solid freeform fabrication object) of the present disclosure. An image forming apparatus 39 illustrated in FIG. 1 forms lamination layers while the active energy ray curable composition of the present application is discharged from a discharging head unit 30 for fabrication and another (second) active energy ray curable composition composed of different ingredients from the active energy ray curable composition of the present disclosure from discharging head units 31 and 32 for a support by using a head unit having inkjet heads arranged movable in the directions indicated by the arrows A and B and curing each composition by ultraviolet irradiators 33 and 34 placed adjacent to the discharging head units 31 and 32. More specifically, after the discharging head units 31 and 32 for a support discharge the second active energy ray curable composition onto a fabrication object support substrate 37 for additive manufacturing and the second active energy ray curable composition is solidified by irradiation of an active energy ray to form a first support layer having a pool for fabrication, the discharging head unit 30 for additive manufacturing discharges the first active energy ray curable composition onto the pool followed by irradiation of an active energy ray for solidification, thereby to form a first additive manufacturing layer. This step is repeated multiple times while the stage 38 movable in the vertical direction is lowered to laminate the support layer and the additive manufacturing layer, thereby fabricating a three dimensional object 35. Thereafter, an additive manufacturing support 36 is removed, if desired. Although only a single discharging head unit 30 for fabrication is provided in FIG. 1, the apparatus can have two or more discharging head units 30. Alternatively, an image may be formed on a nail by placing a hand or finger on the fabrication object support substrate 37.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Evaluation Method of SI Value

According to the skin sensitization test based on the Local Lymph Node Assay (LLNA), the SI value was measured in the following manner.

Test Material

Positive Control Substance

As positive control material, α-hexylcinnamaldehyde (HCA; product of Wako Pure Chemical Industries, Ltd.) was used.

Medium

As a medium, a liquid mixture containing acetone (product of Wako Pure Chemical Industries, Ltd.) and olive oil (product of Fudimi Pharmaceutical Co., Ltd.) in a volume ratio of 4 to 1 was used.

Animals Used

Before the test, female mice were acclimated about the test substances, the positive control, the medium control for 8 days including 6-day quarantine. No abnormalities were found in all the mice (animals for test) during the quarantine/acclimation period.

Based on the body weights measured two days before the initiation of sensitization, they were categorized into two groups (four mice/group) by the body weight stratified random sampling method so that the body weight of each individual was within ±20 percent of the average body weight of all the individuals. Each of the animals for the test was eight to nine weeks old at the time of the initiation of sensitization. The individuals remaining after the categorization were excluded from the test.

The tested animals were individually identified by application of oil ink to their tale throughout the test period, and also their cages were labeled for identification.

Housing Environment

Throughout the housing period including the quarantine/acclimation period, the animals were housed in an animal room with barrier system, which was set as follows: at temperature range of from 21 to 25 degrees C., 40 to 70 percent in relative humidity, 10 to 15 times/hour of air circulation, and a 12 hour-interval lighting cycle (lighting from 7:00 to 19:00).

The housing cages used were made of polycarbonate, and four animals were housed in each cage. The animals were housed four mice per cage.

The animals were given ad libitum solid feed for laboratory animals MF (product of Oriental Yeast Co., Ltd.). Also, using a water-supply bottle, the animals were given ad libitum tap water in which sodium hypochlorite (PURELOX, product of OYALOX Co., Ltd.) had been added so that the chlorine concentration was about 5 ppm. Bedding used was SUNFLAKE (fir tree, shavings obtained with a power planer) (product of Charles River Inc.). The feed and all of the feeding equipment were sterilized with an autoclave (121 degrees C., 30 min) before use.

The housing cage and the bedding were replaced with new ones at the times of the categorization and the removal of the auricular lymph node (i.e., the time when the animals were transferred from the animal room), and the water-supply bottle and rack were replaced with new ones at the time of the categorization.

Test Method

Group Composition

The group compositions of the medium control group and positive control group used for the measurement of the SI value are shown in Table 1.

TABLE 1

| Test group | Sensitivity substance | Amount of Sensitization (µL/auricle) | Number of sensitization | Number of animals (Animal number) |
|---|---|---|---|---|
| Medium control group | Medium only | 25 | Once per day × 3 days | 4 (1 to 4) |
| Positive control group | 2.50 percent HCA | 25 | Once per day × 3 days | 4 (5 to 8) |

Preparation

Test Substance

Table 2 shows the amount of the test substance. The test substance was weighed in a measuring flask, and the volume of the test substance was adjusted to 1 mL with the medium. The thus-prepared test substance preparation was placed in a light-shielded airtight container (made of glass).

TABLE 2

| | Controlled concentration (w/v percent) | Tested substance weight (g) |
|---|---|---|
| Tested substance | 50.0 | 0.5 |

Positive Control Substance

About 0.25 g of HCA was accurately weighed, and the medium was added to the HCA to have the volume of 1 mL, to thereby prepare a 25.0 w/v percent solution. The thus-prepared positive control substance preparation was placed in a light-shielded airtight container (made of glass).

BrdU 200 mg of 5-bromo-2'-deoxyuridine (BrdU, product of NACALAI TESQUE, INC.) was accurately weighed in a measuring flask. Thereafter, physiological saline (product of OTSUKA PHARMACEUTICAL CO., LTD.) was added into the measuring flask, and dissolved through application of ultrasonic waves. Thereafter, the volume of the resulting solution was adjusted to 20 mL to prepare a 10 mg/mL solution (BrdU preparation). The BrdU preparation was sterilized through filtration with a sterilized filtration filter and placed in a sterilized container.

Preparation Day and Storage Period

The positive control preparation was prepared on the day before the initiation of sensitization, and stored in a cold place except in use. The medium and the test substance preparations were prepared on the day of sensitization. The BrdU preparation was prepared 2 days before administration and stored in a cold place until the day of administration.

Sensitization and Administration of BrdU

Sensitization

Prepared liquids and media of each of the test substance and positive control substance were applied to both auricles of the animal in an amount of 25 µL of each. A micropipettor was used for application. This treatment was performed once a day for three consecutive days.

Administration of BrdU

About 48 hours after the final sensitization, the BrdU preparation liquid (0.5 mL) was intraperitoneally administered once to each of the animals.

Observation and Examination

General Conditions

All the tested animals were observed once or more times a day from the day of the initiation of sensitization to the day of the removal of the auricular lymph node (i.e., the day when the animals were transferred from the animal room). Notably, the observation day was counted from the day of the initiation of sensitization, which was regarded as Day 1.

Measurement of Body Weights

The body weight of each of the tested animals was measured on the day of the initiation of sensitization and on the day of the removal of the auricular lymph node (i.e., the day when the animals were transferred from the animal room). Also, the average and standard error of the body weights were calculated for each group.

Removal of Auricular Lymph Node and Measurement of Weight Thereof

About 24 hours after the administration of BrdU, the tested animals were allowed to undergo euthanasia, and their auricular lymph nodes were sampled. The surrounding tissue of each auricular lymph node was removed, and the auricular lymph nodes from both the auricles were collectively weighed. Also, the average and standard error of the weights of the auricular lymph nodes were calculated for each group. After the measurement of the weights, the auricular lymph nodes of each individual were stored in a frozen state using a biomedical freezer set to −20 degrees C.

Measurement of BrdU Intake

After returning the auricular lymph nodes to room temperature, the auricular lymph nodes were mashed with the gradual addition of physiological saline, and suspended therein. The thus-obtained suspension was filtrated and thereafter dispensed into the wells of a 96-well microplate, with 3 wells being used per individual. The thus-dispensed suspensions were measured for intake of BrdU by the ELISA method. The reagents used were those of a commercially available kit (Cell Proliferation ELISA, BrdU colorimetric, Cat. No. 1647229, product of Roche Diagnostics Inc.). A multiplate reader (FLUOSTAR OPTIMA, product of BMG LABTECH Inc.) was used to measure the absorbance of each well (OD: 370 nm to 492 nm, the intake of BrdU), and the average of the absorbance of the 3 wells for each individual was used as the measurement of BrdU for the individual.

Evaluation of Results

Calculation of Stimulation Index (SI)

As shown in the following formula, the measurement of BrdU intake for each individual was divided by the average of the measurements of BrdU intake in the vehicle control group to calculate the SI value for the individual. The SI value of each test group was the average of the SI values of the individuals. Notably, the SI value was rounded at the second decimal place and shown to the first decimal place.

Change rate of viscosity (%)=(Viscosity of pigment dispersion after storage−Viscosity of pigment dispersion before storage)/(Viscosity of pigment dispersion before storage)×100

SI=(Average (average of 3 well) of BrdU measuring value of individual)/(Average (average of four animals) of BrdU measuring value of medium control group)   Relation 1

Components of Composition

The abbreviations, compound names, manufacturers, and products of the raw materials used for preparing the compositions are shown in Tables 3-1 to 3-3. Monomers (A1-1 to A1-7) which are acrylamide compounds were synthesized by the methods shown in Synthesis Examples 1 to 7. The synthesized compound was identified according to nuclear magnetic resonance spectroscopy (JNM-ECX500, manufactured by JEOL Ltd.) and purity was measured by gas chromatography (GCMS-QP2010 Plus, manufactured by Shimadzu Corporation). These chemical analyses were conventionally conducted.

TABLE 3-1

| | Abbreviation | Compound or structure | Manufacturer and product |
|---|---|---|---|
| Acrylamide compound having ester structure (A1) | A1-1 | | (See Synthesis Example 1) SI = 1.00 |
| | A1-2 | | (See Synthesis Example 2) SI = 1.02 |
| | A1-3 | | (See Synthesis Example 3) SI = 1.05 |
| | A1-4 | | (See Synthesis Example 4) SI = 1.12 |
| | A1-5 | | (See Synthesis Example 5) SI = 1.13 |
| | A1-6 | | (See Synthesis Example 6) SI = 1.21 |
| | A1-7 | | (See Synthesis Example 7) SI = 1.70 |

TABLE 3-1-continued

| | Abbreviation | Compound or structure | Manufacturer and product |
|---|---|---|---|
| Monofunctional polymerizable compound A2 other than acrylamide compound A1 | A2-1 | [structure] | 2-hydroxyethyl methacrylate, SI = 1.26, Manufactured by Tokyo Chemical Industry Co. Ltd.. |
| | A2-2 | [structure] | Isobornyl acrylate, SI = 8.30, manufactured by Osaka Organic Chemical Company |

TABLE 3-2

| | | | |
|---|---|---|---|
| Polyfunctional polymerizable compound B1 having stimulation index SI value of 3 or less | B1-1 | [structure] | 2G, SI = 1.05, manufactured by Shin-Nakamura Chemical Co.,Ltd. |
| | B1-2 | [structure] | DCP, SI = 1.34, manufactured by Shin Nakamura Chemical Co., Ltd. |
| | B1-3 | [structure] | TMPT, SI = 1.03, manufactured by Shin Nakamura Chemical Co., Ltd. |
| | B1-4 | [structure] m + n = 10 | A- BPE-10, SI = 1.24, manufactured by Shin-Nakamura Chemical Co., Ltd. B- |
| | B1-5 | [structure] n = 10 | APG-700, SI = 1.15, manufactured by Shin-Nakamura Chemical Co., Ltd. |
| | B1-6 | [structure] | (See Synthesis Example 8) SI = 1.40 |
| | B1-7 | [structure] | HX-620, SI = 0.92, manufactured by Nippon Kayaku Co., Ltd |

TABLE 3-2-continued

| | | | |
|---|---|---|---|
| B1-8 | 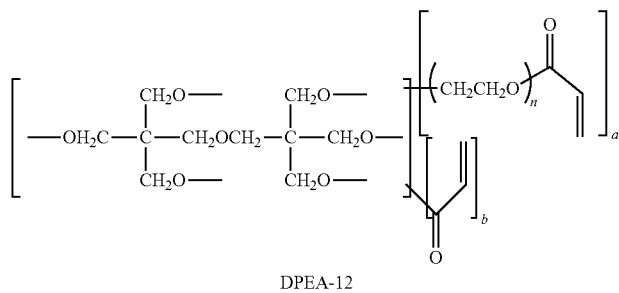 DPEA-12 | | DPEA-12, SI = 1.55, manufactured by Nippon Kayaku Co., Ltd. |
| B1-9 | 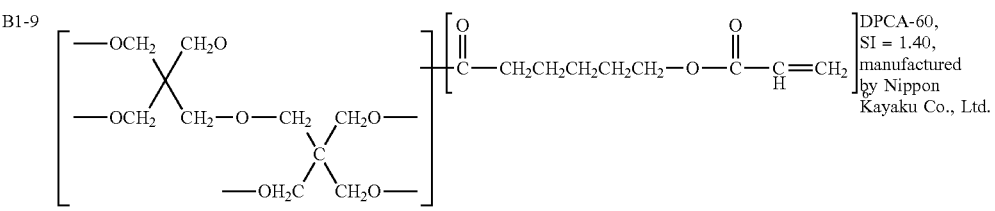 | | DPCA-60, SI = 1.40, manufactured by Nippon Kayaku Co., Ltd. |
| B1-10 | 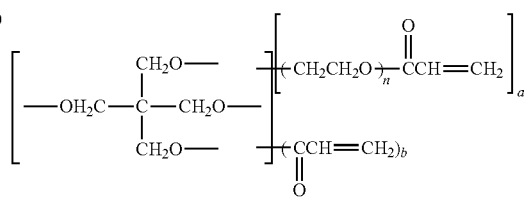 $a + b = 4, \overline{n} = 4$ | | RP-1040, SI = 1.43, manufactured by Nippon Kayaku Co., Ltd. |
| Polyfunctional polymerizable compound B2 other than B | B2-1 | 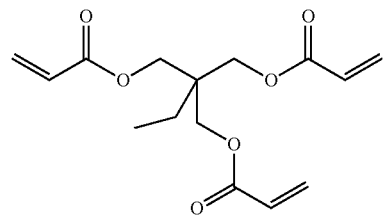 [SMILES: C=CC(=O)OCC(CC)(COC(=O)C=C)COC(=O)C=C] | M-3547, SI = 3.42, manufactured by TOAGOSEI CO., LTD. |

TABLE 3-3

| | | | |
|---|---|---|---|
| Polymerization initator C1 having no maximum absorption peak at 365 to 405 nm | C1-1 | 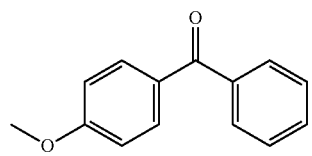 [SMILES: COc1ccc(C(=O)c2ccccc2)cc1] | "Methoxybenzophenone" manufactured by Tokyo Chemical Industry Co., Ltd. |
| | C1-2 | 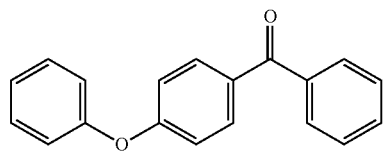 [SMILES: O=C(c1ccccc1)c1ccc(Oc2ccccc2)cc1] | 4-benzyloxybenzophenone, manufactured by Tokyo Chemical Industry Co. Ltd.. |
| | C1-3 | 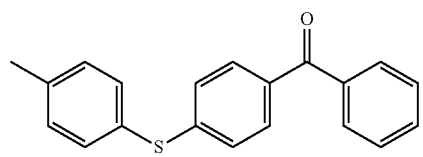 [SMILES: Cc1ccc(Sc2ccc(C(=O)c3ccccc3)cc2)cc1] | 4-benzoyl 4'-methyldiphenyl sulfide (BMS), manufactured by Tokyo Chemical Industry Co., Ltd. |

TABLE 3-3-continued

| | | | |
|---|---|---|---|
| | C1-4 | [structure: 4-phenylbenzophenone] | 4-Phenyl benzophenone, manufactured by Tokyo Chemical Industry Co. Ltd.. |
| | C1-5 | [structure: methyl benzoyl formate] | Methyl benzoyl formate, manufactured by Tokyo Chemical Industry Co., Ltd. |
| | C1-6 | [structure: ethyl benzoyl formate] | Ethyl benzoyl formate, manufactured by Tokyo Chemical Industry Co., Ltd. |
| Polymerization initiator C2 other than C1 | C2-1 | [structure: 2,4-diethylthioxanthone] | DETX-s, manufactured by Nippon Kayaku Co., Ltd. |
| | C2-2 | Pheylbis(2,4,6-trimethyl benzoyl)phosphine oxide | Irgacure 819, manufactured by BASF Japan Ltd. |
| | C2-3 | 2,4,6-Trimethyl benzoyl-diphenyl-phosphine oxide | Irgacure TPO,, manufactured by BASF Japan Ltd. |
| Hydrogen donor (D) | D-1 | [structure: methyl N,N-dimethyl anthranilate] | Methyl N, N-dimethyl anthranilate, manufactured by Tokyo Chemical Industry Co., Ltd. |
| | D-2 | [structure: ethyl p-dimethyl amino benzoate] | Ethyl p-dimethyl amino benzoate, manufactured by Tokyo Chemical Industry Co., Ltd. |
| | D-3 | [structure of Speedcure 7040 with repeating units l, m, k] | Speedcure 7040, manufactured by Lambson Group Ltd. |
| Other Components | Polymerization inhibitor | 4-methoxyphenol | Metoquinone, manufactured by SeikoChemical Co., Ltd. |
| | Surfactant | Silicone-based surfactant | BYK-UV3510, manufactured by BYK Japan KK |

Synthesis Example of Acrylamide Compound A1

The following is synthesis examples of the acrylamide compounds A1 of A1-1 to A1-7 shown in Table 3-1.

Note that A1-1 to A1-7 correspond to the exemplary compounds d1-1, d1-2, d4-1, g1-1, d1-5, g1-5, and i1-2, respectively.

Synthetic Example 1

Synthesis of N-acryloyl-N-methyl Glycine Methyl Ester (A1-1)

A total of 0.30 mol of N-methyl glycine and 400 mL of methanol were stirred and mixed at 0 to 10 degrees C. and 0.33 mol of thionyl chloride was slowly dripped to the mixture while the temperature was maintained. After completion of the dripping, methanol was distilled away at 40 to 60 degrees C. under a reduced pressure to obtain 0.30 mol of N-methylglycine methyl ester hydrochloric acid salt as a white solid. A total of 0.45 mol of potassium carbonate (reagent, manufactured by Kanto Chemical Co., Inc.) and 400 mL of water were stirred and mixed at 0 to 10 degrees C. and 0.33 mol of acrylic acid chloride (reagent, manufactured by Wako Pure Chemical Industries, Ltd.) was slowly dripped to the mixture while the temperature was maintained. After completion of the dripping, the resulting mixture was extracted three times with 400 mL of ethyl acetate (manufactured by Kanto Chemical Co., Inc.) followed by rinsing with 400 mL of water including the ethyl acetate layers. Ethyl acetate was distilled away at 40 degrees C. under a reduced pressure to obtain 0.20 mol of the target N-acryloyl-N-methylglycine methyl ester (A1-1) as a nearly colorless and transparent liquid. Purity was 98.3 percent by mass.

N-acryloyl-N-methyl glycine methyl ester (A1-1) has a molecular weight of 157.2 and is a known compound (CAS registration number 72065-23-7).

When the compound was tested about safety, the AMES test was negative according to the OECD test guideline TG471 (±S9mix). Oral toxicity was determined according to the OECD Test Guideline TG423 and 0 out of 6 cases died, and the LD50 was 2,000 mg/kg or more. The compound was subject to skin irritation according to OECD Test Guideline TG404 and PII was 0.5. The skin sensitivity was measured according to OECD Test Guideline TG442B and the SI value was found to be 1.00, indicating that the compound had a significantly low impact on human health.

Synthetic Example 2

Synthesis of N-acryloyl-N-methyl Glycine Ethyl Ester (A1-2)

A total of 0.22 mol of N-acryloyl-N-methyl glycine ethyl ester (A1-2) was obtained as a nearly colorless and transparent liquid in the same manner as in Synthesis Example 1 except that N-methyl glycine methyl ester hydrochloric acid salt was changed to N-methyl glycine methyl ester hydrochloric acid salt (reagent, manufactured by Tokyo Chemical Industry Co., Ltd.). Purity was 98.5 percent by mass.

N-acryloyl-N-methyl glycine ethyl ester (A1-2) has a molecular weight of 171.2 and is a known compound (CAS registration number 170116-05-9).

Synthetic Example 3

Synthesis of N-acryloyl-N-isopropyl Glycine Methyl Ester (A1-3)

A total of 0.22 mol of N-acryloyl-N-isopropyl glycine methyl ester (A1-3) was obtained as a nearly colorless and transparent liquid in the same manner as in Synthesis Example 1 except that N-methyl glycine methyl ester hydrochloric acid salt was changed to N-isopropyl glycine methyl ester hydrochloric acid salt (reagent, manufactured by Tokyo Chemical Industry Co., Ltd.). Purity was 98.5 percent by mass.

N-acryloyl-N-isopropyl glycine methyl ester (A1-3) has a molecular weight of 185.2

Synthetic Example 4

Synthesis of N-acryloyl-N-methyl Glycine Methyl Alanine Methyl Ester (A1-4)

A total of 0.22 mol of N-acryloyl-N-methyl alanine methyl ester (A1-4) was obtained as a nearly colorless and transparent liquid in the same manner as in Synthesis Example 1 except that N-methyl glycine methyl ester hydrochloric acid salt was changed to N-methyl alanine methyl ester hydrochloric acid salt (reagent, manufactured by Tokyo Chemical Industry Co., Ltd.). Purity was 98.5 percent by mass.

N-acryloyl-N-methyl alanine methyl ester (A1-4) has a molecular weight of 171.2.

Synthetic Example 5

Synthesis of N-acryloyl-N-methyl Glycine Isopropyl Ester (A1-5)

A total of 0.22 mol of N-acryloyl-N-methyl glycine isopropyl ester (A1-5) was obtained as a nearly colorless and transparent liquid in the same manner as in Synthesis Example 1 except that N-methyl glycine methyl ester hydrochloric acid salt was changed to N-methyl glycine isopropyl ester hydrochloric acid salt (reagent, manufactured by Tokyo Chemical Industry Co., Ltd.). Purity was 98.5 percent by mass.

N-acryloyl-N-methyl glycine isopropyl ester (A1-5) has a molecular weight of 185.2

Synthetic Example 6

Synthesis of N-acryloyl-N-methyl Alanine Isopropyl Ester (A1-6)

A total of 0.22 mol of N-acryloyl-N-methyl alanine isopropyl ester (A1-6) was obtained as a nearly colorless and transparent liquid in the same manner as in Synthesis Example 1 except that N-methyl glycine methyl ester hydrochloric acid salt was changed to N-methyl alanine isopropyl ester hydrochloric acid salt (reagent, manufactured by Tokyo Chemical Industry Co., Ltd.). Purity was 98.5 percent by mass.

N-acryloyl-N-methyl alanine isopropyl ester (A1-6) has a molecular weight of 199.3

Synthesis Example 7

Synthesis of N-acryloylPiperidine-4-ethyl Carboxylate (A1-7)

A total of 0.27 mol of N-acryloyl-piperidine-4-ethyl carboxylate (A1-7) was obtained as a nearly colorless and transparent liquid in the same manner as in Synthesis Example 1 except that N-methyl glycine methyl ester hydrochloric acid salt was changed to piperidine-4-ethyl carboxylate. Purity was 99.2 percent by mass.

N-acryloyl-piperidine-4-ethyl carboxylate (A1-7) has a molecular weight of 211.3 and is a known compound (CAS registration number 845907-79-1).

Synthesis of Polyfunctional Polymerizable Compound B1 Having Stimulation Index SI Value in Skin Sensitivity Test of 3 or Less

Synthetic Example 8

Synthesis of 2-acetyl-1,3-glycerol Dimethacrylate (B1-6)

A total of 57.1 g (250 mmol) of 1,3-glycerol dimethacrylate manufactured by Tokyo Chemical Industry Co. Ltd. was added to 1,000 mL of dehydrated dichloromethane, the atmosphere in the flask was replaced with argon gas, and 36.0 g (360 mmol) of triethylamine was added. Next, subsequent to cooling down to about −10 degrees C., 24.0 g (300 mmol) of acetic acid chloride was slowly dripped in such a manner that the temperature of the system was −10 to −5 degrees C. and the mixture was stirred at room temperature environment for two hours. Further, after the precipitate was removed by filtration, the filtrate was rinsed with water, a saturated aqueous solution of sodium hydrogen carbonate, and a saturated aqueous solution of sodium chloride. Next, subsequent to drying over sodium sulfate, the dried product was concentrated under a reduced pressure to obtain a yellow oily product. Further, 2,000 g of Wakogel C300 (manufactured by Wako Pure Chemical Industries, Ltd.) was charged, and the yellow oily product was purified by column chromatography using hexane and ethyl acetate as eluents to obtain 18.0 g (yield: about 28 percent) of a colorless oily substance of 2-acetyl-1,3-glycerol dimethacrylate (B1-6). Purity was 99.1 percent by mass.

Examples 1 to 50 and Comparative Examples 1 to 10

Preparation of Composition

Each component shown in Tables 4 to 9 were uniformly mixed and filtered with a membrane filter to remove coarse particles, thereby producing compositions of Examples 1 to 50 and Comparative Examples 1 to 10.

TABLE 4

|  | Example | | | | | | | | | |
|---|---|---|---|---|---|---|---|---|---|---|
|  | 1 | 2 | 3 | 4 | 5 | 6 | 7 | 8 | 9 | 10 |
| A1-1 | 22.0 | 32.0 |  |  | 20.0 | 32.0 | 25.0 |  | 20.0 | 20.0 |
| A1-2 |  |  | 51.8 | 51.8 |  |  |  | 34.8 |  |  |
| A1-3 |  |  |  |  |  |  |  |  |  |  |
| A1-4 |  |  |  |  |  |  |  |  |  |  |
| A1-5 |  |  |  |  |  |  |  |  |  |  |
| A1-6 |  |  |  |  |  |  |  |  |  |  |
| A1-7 | 14.8 | 19.8 |  |  | 36.8 | 31.8 | 26.8 | 20.0 | 34.8 | 21.8 |
| A2-1 |  |  |  |  |  |  |  |  |  |  |
| A2-2 |  |  |  |  |  |  |  |  |  |  |
| B1-1 | 10.0 |  |  |  |  |  |  |  |  |  |
| B1-2 |  |  |  |  |  |  |  |  |  |  |
| B1-3 |  |  |  |  |  |  |  |  |  |  |
| B1-4 |  |  |  |  |  |  |  |  |  |  |
| B1-5 |  | 30.0 |  |  |  |  |  | 17.0 |  |  |
| B1-6 |  |  |  |  |  | 5.0 |  |  |  |  |
| B1-7 |  | 5.0 |  | 10.0 | 10.0 |  | 5.0 |  | 17.0 |  |
| B1-8 |  |  |  |  |  | 4.0 |  |  |  | 10.0 |
| B1-9 |  |  |  |  |  |  |  |  |  | 10.0 |
| B1-10 | 30.0 |  | 20.0 | 20.0 | 25.0 | 9.0 | 25.0 | 10.0 | 10.0 | 20.0 |
| B2-1 |  |  |  |  |  |  |  |  |  |  |
| C1-1 |  |  |  |  |  |  |  |  |  | 9.0 |
| C1-2 |  |  |  |  |  |  |  |  |  |  |
| C1-3 | 9.0 | 9.0 | 9.0 |  | 9.0 | 9.0 | 9.0 | 9.0 | 9.0 |  |
| C1-4 |  |  |  | 9.0 |  |  |  |  |  |  |
| C1-5 |  |  |  |  |  |  |  |  |  |  |
| C1-6 |  |  |  |  |  |  |  |  |  |  |
| C2-1 |  |  |  |  |  |  |  |  |  |  |
| C2-2 |  |  |  |  |  |  |  |  |  |  |
| C2-3 |  |  |  |  |  |  |  |  |  |  |
| D-1 | 9.0 | 9.0 | 9.0 | 9.0 | 9.0 | 9.0 | 9.0 |  |  |  |
| D-2 |  |  |  |  |  |  |  | 9.0 | 9.0 | 9.0 |
| D-3 |  |  |  |  |  |  |  |  |  |  |
| Polymerization inhibitor | 0.1 | 0.1 | 0.1 | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 | 0.1 | 0.1 | 0.1 |
| Total of the compositions | 100.0 | 100.0 | 100.0 | 100.0 | 100.0 | 100.0 | 100.0 | 100.0 | 100.0 | 100.0 |

TABLE 5

| | Example | | | | | | | | | |
|---|---|---|---|---|---|---|---|---|---|---|
| | 11 | 12 | 13 | 14 | 15 | 16 | 17 | 18 | 19 | 20 |
| A1-1 | | | | | | | | | | |
| A1-2 | | | | | | | | | | |
| A1-3 | 22.0 | 32.0 | | | | | | | | |
| A1-4 | | | 51.8 | 51.8 | | | | | | |
| A1-5 | | | | | 20.0 | 32.0 | 25.0 | | | |
| A1-6 | | | | | | | | 34.8 | 20.0 | 20.0 |
| A1-7 | 14.8 | 19.8 | | | 36.8 | 31.8 | 26.8 | 20.0 | 34.8 | 21.8 |
| A2-1 | | | | | | | | | | |
| A2-2 | | | | | | | | | | |
| B1-1 | 10.0 | | | | | | | | | |
| B1-2 | | | | | | | | | | |
| B1-3 | | | | | | | | | | |
| B1-4 | | | | | | | | | | |
| B1-5 | | 30.0 | | | | | | 16.0 | | |
| B1-6 | | | | | | | 5.0 | | | |
| B1-7 | 5.0 | | 10.0 | 10.0 | | 5.0 | | | 16.0 | |
| B1-8 | | | | | | | 4.0 | | | 10.0 |
| B1-9 | | | | | | | | | | 10.0 |
| B1-10 | 30.0 | | 20.0 | 20.0 | 25.0 | 9.0 | 25.0 | 15.0 | 15.0 | 20.0 |
| B2-1 | | | | | | | | | | |
| C1-1 | | | | | | | | | | |
| C1-2 | | | | | | | | | | 9.0 |
| C1-3 | | | | | | | | | | |
| C1-4 | 9.0 | 9.0 | 9.0 | | 9.0 | 9.0 | 9.0 | 9.0 | 9.0 | |
| C1-5 | | | | 9.0 | | | | | | |
| C1-6 | | | | | | | | | | |
| C2-1 | | | | | | | | | | |
| C2-2 | | | | | | | | | | |
| C2-3 | | | | | | | | | | |
| D-1 | 9.0 | 9.0 | 9.0 | 9.0 | 9.0 | 9.0 | 9.0 | | | |
| D-2 | | | | | | | | | | 9.0 |
| D-3 | | | | | | | | 5.0 | 5.0 | |
| Polymerization inhibitor | 0.1 | 0.1 | 0.1 | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 | 0.1 | 0.1 | 0.1 |
| Total of the compositions | 100.0 | 100.0 | 100.0 | 100.0 | 100.0 | 100.0 | 100.0 | 100.0 | 100.0 | 100.0 |

TABLE 6

| | Example | | | | | | | | | |
|---|---|---|---|---|---|---|---|---|---|---|
| | 21 | 22 | 23 | 24 | 25 | 26 | 27 | 28 | 29 | 30 |
| A1-1 | 22.0 | 32.0 | | | 20.0 | 32.0 | 25.0 | | 20.0 | 20.0 |
| A1-2 | | | 51.8 | 51.8 | | | | 34.8 | | |
| A1-3 | | | | | | | | | | |
| A1-4 | | | | | | | | | | |
| A1-5 | | | | | | | | | | |
| A1-6 | | | | | | | | | | |
| A1-7 | 14.8 | 19.8 | | | 36.8 | 31.8 | 26.8 | 20.0 | 34.8 | 21.8 |
| A2-1 | | | | | | | | | | |
| A2-2 | | | | | | | | | | |
| B1-1 | 10.0 | | | | | | | | | |
| B1-2 | | | | | | | | | | |
| B1-3 | | | | | | | | | | |
| B1-4 | | | | | | | | | | |
| B1-5 | | 30.0 | | | | | | 20.0 | | |
| B1-6 | | | | | | | 5.0 | | | |
| B1-7 | 5.0 | | 10.0 | 10.0 | | 5.0 | | | 20.0 | |
| B1-8 | | | | | | | 4.0 | | | 10.0 |
| B1-9 | | | | | | | | | | 10.0 |
| B1-10 | 30.0 | | 20.0 | 20.0 | 25.0 | 9.0 | 25.0 | 16.0 | 16.0 | 20.0 |
| B2-1 | | | | | | | | | | |
| C1-1 | | | | 9.0 | | | | | | |
| C1-2 | | | | | | | | 9.0 | | |
| C1-3 | | | | | | | | | | |
| C1-4 | | | | | | | | | 9.0 | 9.0 |
| C1-5 | 9.0 | 9.0 | 9.0 | | | | | | | |
| C1-6 | | | | | 9.0 | 9.0 | 9.0 | | | |

TABLE 6-continued

|  | Example | | | | | | | | | |
|---|---|---|---|---|---|---|---|---|---|---|
|  | 21 | 22 | 23 | 24 | 25 | 26 | 27 | 28 | 29 | 30 |
| C2-1 | | | | | | | | | | |
| C2-2 | | | | | | | | | | |
| C2-3 | | | | | | | | | | |
| D-1 | 9.0 | 9.0 | 9.0 | 9.0 | 9.0 | 9.0 | 9.0 | | | |
| D-2 | | | | | | | | | | 9.0 |
| D-3 | | | | | | | | | | |
| Polymerization inhibitor | 0.1 | 0.1 | 0.1 | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 | 0.1 | 0.1 | 0.1 |
| Total of the compositions | 100.0 | 100.0 | 100.0 | 100.0 | 100.0 | 100.0 | 100.0 | 100.0 | 100.0 | 100.0 |

TABLE 7

|  | Example | | | | | | | | | |
|---|---|---|---|---|---|---|---|---|---|---|
|  | 31 | 32 | 33 | 34 | 35 | 36 | 37 | 38 | 39 | 40 |
| A1-1 | 22.0 | 32.0 | | | 20.0 | 17.0 | 15.0 | | 20.0 | 20.0 |
| A1-2 | | | 22.0 | 32.0 | | | | 34.8 | | |
| A1-3 | | | | | 36.8 | 16.8 | | | | |
| A1-4 | | | | | | | 16.8 | 20.0 | | |
| A1-5 | 14.8 | 19.8 | | | | | | | 26.8 | 20.0 |
| A1-6 | | | 14.8 | 19.8 | | | | | | |
| A1-7 | | | | | | | | | | |
| A2-1 | | | | | | | | | | |
| A2-2 | | | | | | | | | | |
| B1-1 | 10.0 | | | | | 10.0 | | | | |
| B1-2 | | 10.0 | | | | 10.0 | 10.0 | | | |
| B1-3 | | | 10.0 | | | 10.0 | 10.0 | | | 10.0 |
| B1-4 | | | | 10.0 | | | 10.0 | 10.0 | | |
| B1-5 | | 20.0 | | | 10.0 | | | 20.0 | | 10.0 |
| B1-6 | | | | | | | 5.0 | | 20.0 | |
| B1-7 | 5.0 | | 10.0 | 10.0 | | 5.0 | | | 20.0 | |
| B1-8 | | | | | | 4.0 | | | 4.0 | 11.8 |
| B1-9 | | | | | | | | | | 10.0 |
| B1-10 | 30.0 | | 25.0 | 10.0 | 15.0 | 9.0 | 15.0 | 6.0 | | |
| B2-1 | | | | | | | | | | |
| C1-1 | | | | 9.0 | | | | | | |
| C1-2 | | | | | | | | | 9.0 | |
| C1-3 | | | | | | | | | | |
| C1-4 | | | | | | | | | 9.0 | 9.0 |
| C1-5 | 9.0 | 9.0 | 9.0 | | | | | | | |
| C1-6 | | | | | 9.0 | 9.0 | 9.0 | | | |
| C2-1 | | | | | | | | | | |
| C2-2 | | | | | | | | | | |
| C2-3 | | | | | | | | | | |
| D-1 | 9.0 | 9.0 | 9.0 | | | | | 9.0 | 9.0 | 9.0 |
| D-2 | | | | | | | | | | |
| D-3 | | | | 9.0 | 9.0 | 9.0 | 9.0 | | | |
| Polymerization inhibitor | 0.1 | 0.1 | 0.1 | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 | 0.1 | 0.1 | 0.1 |
| Total of the compositions | 100.0 | 100.0 | 100.0 | 100.0 | 100.0 | 100.0 | 100.0 | 109.0 | 109.0 | 100.0 |

TABLE 8

|  | Example | | | | | | | | | |
|---|---|---|---|---|---|---|---|---|---|---|
|  | 41 | 42 | 43 | 44 | 45 | 46 | 47 | 48 | 49 | 50 |
| A1-1 | 22.0 | 32.0 | | | 20.0 | 17.0 | 9.0 | | 75.0 | |
| A1-2 | | | 22.0 | 32.0 | | | | 4.0 | | 85.0 |
| A1-3 | | | | | | | | | | |
| A1-4 | | | | 14.0 | | | | | | |
| A1-5 | 14.0 | | | | | | | | | |
| A1-6 | | 14.0 | | | | | | | | |
| A1-7 | 14.8 | 19.8 | 14.8 | 19.8 | 36.8 | 16.8 | | | | |

TABLE 8-continued

|  | Example | | | | | | | | | |
|---|---|---|---|---|---|---|---|---|---|---|
|  | 41 | 42 | 43 | 44 | 45 | 46 | 47 | 48 | 49 | 50 |
| A2-1 |  |  |  |  |  |  |  |  |  |  |
| A2-2 |  |  |  |  |  |  |  |  |  |  |
| B1-1 | 10.0 |  |  | 14.0 |  | 10.0 | 30.0 | 20.0 |  |  |
| B1-2 |  | 10.0 |  |  | 14.0 | 10.0 | 9.0 | 10.0 |  |  |
| B1-3 |  |  | 10.0 |  |  | 10.0 | 7.0 | 16.0 |  |  |
| B1-4 |  |  |  | 10.0 | 14.0 |  |  | 10.0 |  |  |
| B1-5 |  | 20.0 |  |  | 10.0 |  | 6.8 | 15.8 |  |  |
| B1-6 |  |  |  |  |  |  | 5.0 |  |  |  |
| B1-7 | 5.0 |  | 10.0 | 10.0 |  | 5.0 |  |  | 6.8 |  |
| B1-8 |  |  |  |  |  | 4.0 |  |  |  |  |
| B1-9 |  |  |  |  |  |  |  |  |  |  |
| B1-10 | 30.0 |  | 25.0 | 10.0 | 15.0 | 9.0 | 15.0 | 6.0 |  |  |
| B2-1 |  |  |  |  |  |  |  |  |  |  |
| C1-1 |  |  |  |  |  |  |  |  |  |  |
| C1-2 |  |  |  |  |  |  |  |  |  |  |
| C1-3 |  |  |  |  |  |  | 9.0 | 9.0 | 9.0 | 7.5 |
| C1-4 |  |  |  |  |  |  |  |  |  |  |
| C1-5 |  |  |  |  |  |  |  |  |  |  |
| C1-6 |  |  |  |  |  |  |  |  |  |  |
| C2-1 | 2.0 | 2.0 | 2.0 | 2.0 | 2.0 | 2.0 |  |  |  |  |
| C2-2 |  |  |  |  |  |  |  |  |  |  |
| C2-3 |  |  |  |  |  |  |  |  |  |  |
| D-1 | 2.0 | 2.0 | 2.0 |  |  |  | 9.0 | 9.0 | 9.0 | 7.3 |
| D-2 |  |  |  |  |  |  |  |  |  |  |
| D-3 |  |  |  | 2.0 | 2.0 | 2.0 |  |  |  |  |
| Polymerization inhibitor | 0.1 | 0.1 | 0.1 | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 | 0.1 | 0.1 | 0.1 |
| Total of the compositions | 100.0 | 100.0 | 100.0 | 100.0 | 100.0 | 100.0 | 100.0 | 100.0 | 100.0 | 100.0 |

TABLE 9

|  | Comparative Example | | | | | | | | | |
|---|---|---|---|---|---|---|---|---|---|---|
|  | 1 | 2 | 3 | 4 | 5 | 6 | 7 | 8 | 9 | 10 |
| A1-1 |  |  | 20.0 | 20.0 |  |  |  |  |  |  |
| A1-2 |  |  |  |  | 24.8 | 24.8 |  |  |  |  |
| A1-3 |  |  |  |  |  |  |  |  |  |  |
| A1-4 |  |  |  |  |  |  |  |  |  |  |
| A1-5 |  |  |  |  |  |  |  |  |  |  |
| A1-6 |  |  |  |  |  |  |  |  |  |  |
| A1-7 |  |  |  |  |  |  |  |  |  |  |
| A2-1 | 54.8 |  | 50.0 |  | 70.0 |  | 70.0 |  | 50.0 |  |
| A2-2 |  | 54.8 |  | 50.0 |  | 70.0 |  | 70.0 |  | 50.0 |
| B1-1 |  |  |  |  |  |  |  |  |  |  |
| B1-2 |  |  |  |  |  |  |  |  |  |  |
| B1-3 |  |  |  |  |  |  |  |  |  |  |
| B1-4 |  |  |  |  |  |  |  |  |  |  |
| B1-5 |  |  |  |  |  |  |  |  |  |  |
| B1-6 |  |  |  |  |  |  |  |  |  |  |
| B1-7 |  |  |  |  |  |  |  |  |  |  |
| B1-8 |  |  |  |  |  |  |  |  |  |  |
| B1-9 |  |  |  |  |  |  |  |  | 19.8 |  |
| B1-10 |  |  |  |  |  |  |  |  |  | 19.8 |
| B2-1 | 40.0 | 40.0 | 24.8 | 24.8 |  |  | 24.8 | 24.8 | 20.0 | 20.0 |
| C1-1 |  |  |  |  |  |  |  |  |  |  |
| C1-2 |  |  |  |  |  |  |  |  |  |  |
| C1-3 |  |  |  |  |  |  |  |  |  |  |
| C1-4 |  |  |  |  |  |  |  |  |  |  |
| C1-5 |  |  |  |  |  |  |  |  |  |  |
| C1-6 |  |  |  |  |  |  |  |  |  |  |
| C2-1 |  |  |  |  |  |  |  |  |  |  |
| C2-2 | 5.0 | 5.0 | 5.0 | 5.0 |  |  |  |  | 5.0 | 5.0 |
| C2-3 |  |  |  |  | 5.0 | 5.0 | 5.0 | 5.0 | 5.0 | 5.0 |
| D-1 |  |  |  |  |  |  |  |  |  |  |
| D-2 |  |  |  |  |  |  |  |  |  |  |
| D-3 |  |  |  |  |  |  |  |  |  |  |

TABLE 9-continued

|  | Comparative Example | | | | | | | | | |
|---|---|---|---|---|---|---|---|---|---|---|
|  | 1 | 2 | 3 | 4 | 5 | 6 | 7 | 8 | 9 | 10 |
| Polymerization inhibitor | 0.1 | 0.1 | 0.1 | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 | 0.1 | 0.1 | 0.1 |
| Total of the compositions | 100.0 | 100.0 | 100.0 | 100.0 | 100.0 | 100.0 | 100.0 | 100.0 | 100.0 | 100.0 |

Formation of Print Image by Inkjet

Each composition was filled in a plastic container, and an inkjet head (MH5440, manufactured by Ricoh Co., Ltd.) as a discharging device, and a UV-LED (LED ZERO, wavelength of 395 nm, illuminance at irradiation surface of 1.0 W/cm$^2$, manufactured by Integration Technology Japan) as an active energy ray irradiator, a controller for controlling discharging, and an image forming apparatus including a supply path from the container to the inkjet head.

The temperature of the inkjet head was adjusted in such a manner that the viscosity of the composition became 10 to 12 mPa·s, and the composition was discharged onto a commercially available PET film (Cosmo Shine A4100, thickness of 188 μm, manufactured by TOYOBO CO., LTD.) as a general-purpose film material by inkjet to form a film having a thickness of 10 μm followed by irradiation of ultraviolet rays with a UV-LED to produce a printed image.

Curability

Film that reached the state without tackiness by finger-touching the coating film was determined as cured and the integrated irradiation light quantity required for curing was obtained. The measuring results are shown in Table 10 to FIG. 15. When the integrated irradiation light quantity required for curing was 2.0 J/cm$^2$ or less, the film was determined as practically usable.

Evaluation on Yellow Discoloration

The print sample obtained by the method described in the Formation of Print Image by Inkjet was cut into a square of 5 cm, which was subject to Gretag measurement by a Gretag measuring device (Ci6x, manufactured by X-Rite Inc.). The measuring results are shown in Table 10 to Table 15. In the following evaluation based on b*, Grade C or above is practically usable.

Evaluation Criteria

A: b* is 0.5 or less
B: b* is greater than 0.5 to 1
C: b* is greater than 1 to 2
D: b* is greater than 2 to 8
E: b* is greater than 8

Evaluation on Water Resistance

A cured product obtained by curing each composition into a columnar mold having a thickness of 1 mm and a diameter of 1 cm was immersed in 10 mL of pure water for five hours, and the mass ratio before and after the immersion was defined as a water swelling ratio. The water swelling ratio= (Weight after immersion−Weight before immersion)/ (Weight before immersion)×100 (percent). The measuring results are shown in Table 10 to Table 15. Grade B or above is practically usable.

Evaluation Criteria

A: Water swelling ratio is 101 percent or less.
B: Water swelling ratio is greater than 101 to 105 percent
C: Water swelling ratio is greater than 105 to 120 percent
D: Water swelling ratio is greater than 120 to 150 percent
E: Water swelling ratio is greater than 150

Evaluation of Skin Sensitivity

The stimulation index (SI) value of the composition prepared by the above-described method was determined by the LLNA method defined by OECD Test Guideline 429 and other guidelines. The results are shown in Tables 10 to 15 below. Grade B or above is practically usable.

Evaluation Criteria

A: SI value is less than 1.6.
B: SI value is 1.6 to 3
C: SI value is greater than 3 to less than 6
D: SI value is 6 or greater

TABLE 10

|  | Example | | | | | | | | | |
|---|---|---|---|---|---|---|---|---|---|---|
|  | 1 | 2 | 3 | 4 | 5 | 6 | 7 | 8 | 9 | 10 |
| Integrated irradiation light quantity required for curing (J/cm$^2$) | 0.8 | 0.9 | 1.0 | 0.9 | 1.1 | 1.2 | 1.1 | 0.6 | 0.7 | 0.9 |
| Yellow discoloration | A | A | A | A | A | A | A | A | A | A |
| Water resistance | A | A | A | A | A | A | A | A | A | A |
| Skin sensitization | A | A | A | A | A | A | A | A | A | A |

TABLE 11

|  | Example | | | | | | | | | |
|---|---|---|---|---|---|---|---|---|---|---|
|  | 11 | 12 | 13 | 14 | 15 | 16 | 17 | 18 | 19 | 20 |
| Integrated irradiation light quantity required for curing (J/cm$^2$) | 1.2 | 1.3 | 1.0 | 1.1 | 1.1 | 0.9 | 1.3 | 1.5 | 1.6 | 1.3 |
| Yellow discoloration | A | A | A | A | A | A | A | A | A | A |
| Water resistance | A | A | A | A | A | A | A | A | A | A |
| Skin sensitization | A | A | A | A | A | A | A | A | A | A |

TABLE 12

|  | Example | | | | | | | | | |
|---|---|---|---|---|---|---|---|---|---|---|
|  | 21 | 22 | 23 | 24 | 25 | 26 | 27 | 28 | 29 | 30 |
| Integrated irradiation light quantity required for curing (J/cm$^2$) | 1.8 | 1.7 | 1.9 | 1.5 | 1.4 | 1.7 | 1.7 | 1.6 | 1.8 | 1.5 |

TABLE 12-continued

| | Example | | | | | | | | | |
|---|---|---|---|---|---|---|---|---|---|---|
| | 21 | 22 | 23 | 24 | 25 | 26 | 27 | 28 | 29 | 30 |
| Yellow discoloration | B | A | B | A | B | A | A | A | B | B |
| Water resistance | A | B | A | B | B | B | B | B | A | B |
| Skin sensitization | A | A | A | A | A | A | A | A | A | A |

TABLE 13

| | Example | | | | | | | | | |
|---|---|---|---|---|---|---|---|---|---|---|
| | 31 | 32 | 33 | 34 | 35 | 36 | 37 | 38 | 39 | 40 |
| Integrated irradiation light quantity required for curing (J/cm$^2$) | 1.7 | 1.6 | 1.6 | 1.4 | 1.9 | 1.9 | 1.7 | 1.8 | 1.6 | 1.5 |
| Yellow discoloration | B | A | B | B | B | B | B | A | B | B |
| Water resistance | A | B | B | B | B | B | B | B | B | B |
| Skin sensitization | B | B | B | B | A | A | A | B | B | B |

TABLE 14

| | Example | | | | | | | | | |
|---|---|---|---|---|---|---|---|---|---|---|
| | 41 | 42 | 43 | 44 | 45 | 46 | 47 | 48 | 49 | 50 |
| Integrated irradiation light quantity required for curing (J/cm$^2$) | 2.0 | 1.9 | 1.8 | 1.9 | 1.9 | 2.0 | 2.0 | 2.0 | 2.0 | 2.0 |
| Yellow discoloration | C | C | C | C | C | C | C | C | C | C |
| Water resistance | A | B | B | B | B | B | B | B | B | B |
| Skin sensitization | B | B | B | B | B | B | B | B | B | B |

TABLE 15

| | Comparative Example | | | | | | | | | |
|---|---|---|---|---|---|---|---|---|---|---|
| | 1 | 2 | 3 | 4 | 5 | 6 | 7 | 8 | 9 | 10 |
| Integrated irradiation light quantity required for curing (J/cm$^2$) | 10.0 | 1.0 | 13.5 | 1.5 | 15.5 | 1.2 | 18.5 | 1.1 | 14.5 | 0.9 |
| Yellow discoloration | B | B | B | C | C | B | B | B | B | B |
| Water resistance | D | B | E | B | C | B | C | B | D | B |
| Skin sensitization | D | D | E | D | E | D | E | E | E | E |

As seen in the results shown in Tables 10 to 15, the compositions of Examples 1 to 50 are more excellent than the compositions of Comparative Examples 1 to 10 regarding curability, yellow discoloration, water resistance, and skin sensitization. The composition was found to be suitably applicable as an artificial nail composition.

The present disclosure relates to the active energy ray-curable composition of the following 1 and also includes the following 2 to 16 as embodiments.

1. An active energy ray curable composition contains an acrylamide compound A1 represented by the following Chemical formula 1 or the following Chemical formula 2, a multi-functional polymerizable compound B1 having an SI value of 3 or less in a skin sensitivity test, a polymerization initiator C1 having no maximum absorption peak in a wavelength range of from 365 to 405 nm, and a hydrogen donor D.

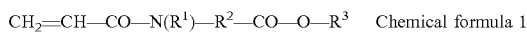

$CH_2$=CH—CO—N($R^1$)—$R^2$—CO—O—$R^3$    Chemical formula 1

In Chemical formula 1, $R^1$ represents a hydrogen atom or an alkyl group having a linear or branched chain having one to four carbon atoms, $R^2$ represents an alkyl group having a linear or branched chain having one to four carbon atoms, and $R^3$ represents an alkyl group having a linear or branched chain having one to four carbon atoms. The total number of carbon atoms of $R^1$, $R^2$, and $R^3$ is from two to six.

Chemical formula 2

In Chemical formula 2, X represents a ring structure having a nitrogen atom and two to five carbon atoms, $R^4$ represents a single bond or an alkyl group having a linear or branched chain having one to three carbon atoms, and $R^5$ represents a linear or branched chain having one to three carbon atoms. The total number of carbon atoms of X, $R^4$, and $R^5$ are from three to six.

2. The active energy ray curable composition according to 1 mentioned above, wherein the acrylamide compound A1 is represented by the Chemical formula 1 and $R^3$ represents an alkyl group having one or two carbon atoms.

3. The active energy ray curable composition according to 1 or 2 mentioned above, wherein the multi-functional polymerizable compound B1 contains at least one member selected from the group consisting of diethylene glycol dimethacrylate (2G), DCP, trimethylol propane trimethacrylate, (TMPT), A-BPE-10, APG-700, 3-acetyl-1,2-dimethacryloyloxy propane, HX-620, DPEA-12, DPCA-60, and RP-1040.

4. The active energy ray curable composition according to any one of 1 to 3 mentioned above, further contains no organic solvent.

5. An active energy ray curable ink contains the active energy ray curable composition of any one of 1 to 4 mentioned above.

6. The active energy ray curable ink according to 5 mentioned above for inkjet.

7. A composition accommodating container contains the active energy ray curable composition of any one of 1 to 4 mentioned above or the active energy ray curable ink 5 or 6 mentioned above and a container containing the active energy ray curable composition or the active energy ray curable ink.

8. A two or three dimensional image forming apparatus includes the active energy ray curable composition of any one of 1 to 4 mentioned above or the active energy ray curable ink of 5 or 6 mentioned above, a container containing the active energy ray curable composition or the active energy ray curable ink, and an irradiator configured to emit active energy rays.

9. The two or three dimensional image forming apparatus according to 8 mentioned above, wherein the irradiator includes an ultraviolet light emitting diode (UV-LED) that emits an ultraviolet ray having a peak in a wavelength range of from 365 to 405 nm.

10. A two or three dimensional image forming method includes applying the active energy ray curable composition of any one of 1 to 4 mentioned above or the active energy ray curable ink of 5 or 6 mentioned above and irradiating the active energy ray curable composition or the active energy ray curable ink with an active energy ray to form a two or three dimensional image.

11. The two or three dimensional image forming method according to 10 mentioned above, wherein the active energy ray is an ultraviolet ray having a peak in a wavelength range of from 365 to 405 nm emitted by an ultraviolet light emitting diode (UV-LED).

12. Cured matter contains the active energy ray curable composition of any one of 1 to 4 mentioned above or the active energy ray curable ink of 5 or 6 mentioned above.

13. Decorative matter contains a substrate and a surface decoration formed of the cured matter of 12 mentioned above on the substrate.

14. An artificial nail composition contains the composition of any one of 1 to 4 mentioned above.

15. A nail decorative material contains the artificial nail composition of 14 mentioned above.

16. An artificial nail contains cured matter of the artificial nail composition of 14 mentioned above.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:
1. An active energy ray curable composition, comprising:
an acrylamide compound A1 represented by the following Chemical formula 1 or the following Chemical formula 2;
a multi-functional polymerizable compound B1 having an SI value of 3 or less in a skin sensitivity test;
a polymerization initiator C1 having no maximum absorption peak in a wavelength range of from 365 to 405 nm; and a hydrogen donor D, $$CH_2=CH-CO-N(R^1)-R^2-CO-O-R^3 \quad \text{Chemical formula 1}$$

where $R^1$ represents a hydrogen atom or an alkyl group comprising a linear or branched chain comprising one to four carbon atoms, $R^2$ and $R^3$ each independently represent an alkyl group comprising a linear or branched chain comprising one to four carbon atoms, and a total number of carbon atoms of $R^1$, $R^2$, and $R^3$ is from two to six, Chemical formula 2

where X represents a ring structure comprising a nitrogen atom and two to five carbon atoms, $R^4$ represents a single bond or an alkyl group comprising a linear or branched chain comprising one to three carbon atoms, $R^5$ represents a linear or branched chain comprising one to three carbon atoms, and a total number of carbon atoms of X, $R^4$, and $R^5$ is from three to six.

2. The active energy ray curable composition of claim 1, wherein the acrylamide compound A1 is represented by Chemical formula 1 and $R^3$ represents an alkyl group comprising one or two carbon atoms.

3. The active energy ray curable composition of claim 1, wherein the multi-functional polymerizable compound B1 comprises at least one member selected from the group consisting of diethylene glycol dimethacrylate (2G), DCP, trimethylol propane trimethacrylate (TMPT), A-BPE-10, APG-700, 3-acetyl-1,2-dimethacryloyloxy propane, HX-620, DPEA-12, DPCA-60, and RP-1040.

4. The active energy ray curable composition of claim 1, further comprising no organic solvent.

5. An active energy ray curable ink, comprising:
the active energy ray curable composition of claim 1.

6. An inkjet method, comprising discharging the active energy ray curable ink of claim 5.

7. A composition accommodating container, comprising:
the active energy ray curable ink of claim 5; and
a container comprising the active energy ray curable composition or an active energy ray curable ink comprising the active energy ray curable composition.

8. A two or three dimensional image forming apparatus, comprising:
the active energy ray curable ink of claim 5;
a container comprising the active energy ray curable composition or the active energy ray curable ink; and
an irradiator configured to emit active energy rays.

9. The two or three dimensional image forming apparatus of claim 8, wherein the irradiator comprises an ultraviolet light emitting diode (UV-LED) that emits an ultraviolet ray having a peak in a wavelength range of from 365 to 405 nm.

10. A two or three dimensional image forming method, comprising:
applying the active energy ray curable ink of claim 5; and
irradiating the active energy ray curable ink with an active energy ray to form a two or three dimensional image.

11. The two or three dimensional image forming method of claim 10, wherein the active energy ray is an ultraviolet ray having a peak in a wavelength range of from 365 to 405 nm emitted by an ultraviolet light emitting diode (UV-LED).

12. Cured matter, comprising:
the active energy ray curable composition of claim 1 or an active energy ray curable ink comprising the active energy ray curable composition.

13. Decorative matter, comprising:
a substrate: and
a surface decoration formed of the cured matter of claim 12 on the substrate.

14. An artificial nail composition, comprising:
the active energy ray curable composition of claim 1.

15. A nail decorative material, comprising:
the artificial nail composition of claim 14.

16. An artificial nail, comprising:
cured matter of the artificial nail composition of claim 14.

\* \* \* \* \*